(12) United States Patent
Freed et al.

(10) Patent No.: US 7,073,055 B1
(45) Date of Patent: Jul. 4, 2006

(54) SYSTEM AND METHOD FOR PROVIDING DISTRIBUTED AND DYNAMIC NETWORK SERVICES FOR REMOTE ACCESS SERVER USERS

(75) Inventors: Michael Freed, Arlington Heights, IL (US); Satish Amara, Mount Prospect, IL (US); Boby Joseph, Mount Prospect, IL (US)

(73) Assignee: 3Com Corporation, Marlborough, MA (US)

( * ) Notice: Subject to any disclaimer, the term of this patent is extended or adjusted under 35 U.S.C. 154(b) by 837 days.

(21) Appl. No.: 09/791,176

(22) Filed: Feb. 22, 2001

(51) Int. Cl.
*G06F 17/00* (2006.01)

(52) U.S. Cl. ............... 713/155; 726/4; 726/10
(58) Field of Classification Search ........ 713/155–156, 713/150; 705/14, 50; 709/227; 726/3–4, 726/10
See application file for complete search history.

(56) References Cited

U.S. PATENT DOCUMENTS

| | | | |
|---|---|---|---|
| 4,644,533 A | 2/1987 | Braff et al. | 370/94 |
| 4,881,263 A | 11/1989 | Herbison et al. | 380/21 |
| 4,996,685 A | 2/1991 | Farese et al. | 370/58.1 |
| 5,014,234 A | 5/1991 | Edwards, Jr. | 364/900 |
| 5,138,712 A | 8/1992 | Corbin | 395/700 |
| 5,301,273 A | 4/1994 | Konishi | 395/200 |
| 5,347,304 A | 9/1994 | Moura et al. | 348/12 |
| 5,430,727 A | 7/1995 | Callon | 370/85.13 |
| 5,442,749 A | 8/1995 | Northcutt et al. | 395/200.09 |
| 5,488,412 A | 1/1996 | Majeti et al. | 348/10 |
| 5,489,897 A | 2/1996 | Inoue | 340/870.39 |
| 5,528,595 A | 6/1996 | Walsh et al. | 370/85.13 |
| 5,583,931 A | 12/1996 | Schneider et al. | 379/399 |
| 5,586,121 A | 12/1996 | Moura et al. | 370/404 |
| 5,598,410 A | 1/1997 | Stone | 370/469 |

(Continued)

FOREIGN PATENT DOCUMENTS

WO WO 00/67385 11/2000

OTHER PUBLICATIONS

Performance of TCP and UDP protocols in multi-hop multi-rate wireless networks; Bansal, S.; Shorey, R.; Kherani, A.A.; Wireless Comunications and Networking Conference, 2004. WCNC. 2004 IEEE vol. 1, Mar. 21-25, 2004 Page(s):231-236 vol. 1.*

(Continued)

*Primary Examiner*—David Jung
(74) *Attorney, Agent, or Firm*—McDonnell Boehnen Hulbert & Berghoff LLP

(57) ABSTRACT

A system and methods for providing distributed and dynamic network services to remote access users. One of the methods includes providing a first certificate for requesting dynamic network services by a user network entity, and at least one second certificate for requesting static network services by the user network entity. According to one method, a user of the user network entity may generate a first message to request dynamic network services from a network service provider entity. For example, the first message may include the first certificate, a digital signature generated with a private encryption key associated with the first certificate and list of network service that the user wishes to set up dynamically. In one embodiment, when the network service provider entity receives the first message, the network service provider entity verifies the authenticity of the first certificate and, if the first certificate is authentic, the network service provider entity configures a network connection between the user network entity and a data network based on the network services requested by the user in the first message.

40 Claims, 15 Drawing Sheets

U.S. PATENT DOCUMENTS

| | | | |
|---|---|---|---|
| 5,600,717 A | 2/1997 | Schneider et al. | 379/399 |
| 5,606,606 A | 2/1997 | Schneider et al. | 370/399 |
| 5,608,446 A | 3/1997 | Carr et al. | 348/6 |
| 5,610,910 A | 3/1997 | Focsaneanu et al. | 370/351 |
| 5,623,542 A | 4/1997 | Schneider et al. | 379/399 |
| 5,623,601 A | 4/1997 | Vu | 395/187.01 |
| 5,636,211 A | 6/1997 | Newlin | 370/465 |
| 5,675,732 A | 10/1997 | Majeti et al. | 395/200.01 |
| 5,675,742 A | 10/1997 | Jain et al. | 395/200 |
| 5,678,041 A | 10/1997 | Baker et al. | 395/609 |
| 5,708,654 A | 1/1998 | Arndt et al. | 370/242 |
| 5,710,885 A | 1/1998 | Bondi | 395/200.54 |
| 5,712,914 A * | 1/1998 | Aucsmith et al. | 380/30 |
| 5,724,510 A | 3/1998 | Arndt et al. | 395/200.5 |
| 5,761,602 A | 6/1998 | Wagner et al. | 455/3.1 |
| 5,778,181 A | 7/1998 | Hidary et al. | 395/200.48 |
| 5,784,597 A | 7/1998 | Chiu et al. | 395/552 |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | 395/200.61 |
| 5,790,806 A | 8/1998 | Koperda | 395/200.82 |
| 5,793,747 A | 8/1998 | Kline | 370/230 |
| 5,799,086 A | 8/1998 | Sudia | 380/23 |
| 5,805,804 A | 9/1998 | Laursen et al. | 395/200.02 |
| 5,809,252 A | 9/1998 | Beighe et al. | 395/200.57 |
| 5,812,819 A | 9/1998 | Rodwin et al. | 395/500 |
| 5,815,664 A | 9/1998 | Asano | 395/200.57 |
| 5,818,845 A | 10/1998 | Moura et al. | 370/449 |
| 5,819,028 A | 10/1998 | Manghirmalani et al. | 395/185.1 |
| 5,819,042 A | 10/1998 | Hansen | 395/200.52 |
| 5,828,655 A | 10/1998 | Moura et al. | 370/236 |
| 5,828,666 A | 10/1998 | Focsaneanu et al. | 370/389 |
| 5,835,720 A | 11/1998 | Nelson et al. | 395/200.54 |
| 5,835,727 A | 11/1998 | Wong et al. | 395/200.68 |
| 5,841,777 A | 11/1998 | Cohen | 370/433 |
| 5,848,233 A | 12/1998 | Radia et al. | 395/187.01 |
| 5,852,721 A | 12/1998 | Dillon et al. | 395/200.47 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,872,523 A | 2/1999 | Dellaverson et al. | 340/825.52 |
| 5,884,024 A | 3/1999 | Lim et al. | 395/187.01 |
| 5,892,754 A | 4/1999 | Kompella et al. | 370/236 |
| 5,894,479 A | 4/1999 | Mohammed | 370/401 |
| 5,903,558 A | 5/1999 | Jones et al. | 370/351 |
| 5,909,549 A | 6/1999 | Compliment et al. | 709/223 |
| 5,913,037 A | 6/1999 | Spofford et al. | 395/200.56 |
| 5,915,119 A | 6/1999 | Cone | 395/750.02 |
| 5,922,049 A | 7/1999 | Radia et al. | 709/220 |
| 5,922,051 A | 7/1999 | Sidey | 709/223 |
| 5,923,659 A | 7/1999 | Curry et al. | 370/401 |
| 5,926,458 A | 7/1999 | Yin | 370/230 |
| 5,929,850 A | 7/1999 | Broadwin et al. | 345/327 |
| 5,941,988 A | 8/1999 | Bhagwat et al. | 713/201 |
| 5,943,604 A | 8/1999 | Chen et al. | 455/5.1 |
| 5,954,797 A | 9/1999 | Sidey | 709/223 |
| 5,958,007 A | 9/1999 | Lee et al. | 709/219 |
| 5,960,177 A | 9/1999 | Tanno | 395/200.59 |
| 5,974,453 A | 10/1999 | Anderson et al. | 709/220 |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | 713/201 |
| 5,999,536 A | 12/1999 | Kawafuji et al. | 370/401 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A | 12/1999 | Woundy | 370/401 |
| 6,012,088 A | 1/2000 | Li et al. | 709/219 |
| 6,013,107 A | 1/2000 | Blackshear et al. | 703/229 |
| 6,014,545 A | 1/2000 | Wu et al. | 455/3.1 |
| 6,018,767 A | 1/2000 | Fijolek et al. | 709/218 |
| 6,031,841 A | 2/2000 | Woundy | 370/410 |
| 6,032,019 A | 2/2000 | Chen et al. | 455/5.1 |
| 6,041,041 A | 3/2000 | Ramanathan et al. | 370/241 |
| 6,046,979 A | 4/2000 | Bauman | 370/229 |
| 6,049,546 A | 4/2000 | Ramakrishnan | 370/412 |
| 6,049,825 A | 4/2000 | Yamamoto | 709/221 |
| 6,049,826 A | 4/2000 | Beser | 709/222 |
| 6,052,724 A | 4/2000 | Willie et al. | 709/223 |
| 6,055,236 A | 4/2000 | Nessett et al. | 370/389 |
| 6,058,421 A | 5/2000 | Fijolek et al. | 709/225 |
| 6,061,349 A | 5/2000 | Coile et al. | 370/389 |
| 6,064,372 A | 5/2000 | Kahkoska | 345/173 |
| 6,065,049 A | 5/2000 | Beser | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | 713/201 |
| 6,073,178 A | 6/2000 | Wong et al. | 709/229 |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,112,258 A | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,240,464 B1 | 5/2001 | Fijolek et al. | 709/250 |
| 6,243,369 B1 | 6/2001 | Grimwood et al. | 370/335 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar | 370/486 |
| 6,275,853 B1 | 8/2001 | Beser et al. | 709/223 |
| 6,289,377 B1 | 9/2001 | Lalwaney et al. | 709/222 |
| 6,295,554 B1 | 9/2001 | Karadogan | 709/219 |
| 6,301,223 B1 | 10/2001 | Hrastar et al. | 370/227 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |
| 6,385,651 B1* | 5/2002 | Dancs et al. | 709/227 |
| 6,393,478 B1 | 5/2002 | Bahlmann | 709/224 |
| 6,442,158 B1 | 8/2002 | Beser | 370/352 |
| 6,449,291 B1 | 9/2002 | Burns et al. | 370/516 |
| 6,453,472 B1 | 9/2002 | Leano et al. | 725/111 |
| 6,490,727 B1 | 12/2002 | Nazarathy et al. | 725/129 |
| 6,510,162 B1 | 1/2003 | Fijolek et al. | 370/432 |
| 2001/0014869 A1* | 8/2001 | Yoshizawa | 705/14 |
| 2001/0034704 A1* | 10/2001 | Farhat et al. | 705/39 |
| 2002/0122050 A1 | 9/2002 | Sandberg | 345/705 |
| 2002/0136165 A1 | 9/2002 | Ady et al. | 370/241 |
| 2003/0028891 A1 | 2/2003 | Hardt et al. | 725/107 |

OTHER PUBLICATIONS

PM/Ethernet-kRMA: a high performance remote memory access facility using multiple gigabit ethernet cards Sumimoto, S.; Kumon, K; Cluster Computing and the Grid, 2003. Proceedings, CCGrid 2003. 3rd IEEE/ACM International Symposium on Page(s) 326-333.*

The GIGAswitch control processor; Walsh, R.J.; Ozveren, C.M.; Network, IEEE vol. 9, Issue 2, Jan.-Feb. 1995 Page(s):36-43.*

Cable Television Laboratories, Inc., "*Packet Cable*", 2000, p. 1.

J. Postel, "*User Datagram Protocol*", RFC 768, Aug. 28, 1980, pp. 1-3.

Information Sciences Institute, University of Southern California, "*Internet Protocol*", RFC 791, Sep. 1981, pp. i-20.

J. Postel, "*Internet Control Message Protocol*", Network Working Group, RFC 792, Sep. 1981, pp. 1-21.

Information Sciences Institute, University of Southern California, "*Transmission Control Protocol*", RFC 793, Sep. 1981, pp. i-26.

J. Case et al., "*A Simple Network Management Protocol (SNMP)*", Network Working Group, RFC 1157, May 1990, pp. 1-19.

Bill Croft et al., "*Bootstrap Protocol (BOOTP)*", Network Working Group, RFC 951, Sep. 1985, pp. 1-12.

K. Sollins, "*The TFTP Protocol (Revision 2)*", Network Working Group, RFC 1350, Jul. 1992, pp. 1-11.

W. Simpson, "*The Point-to-Point Protocol (PPP)*", Network Working Group, RFC 1661, Jul. 1994, pp. i-52.

S. Alexander, "*DHCP Options and BOOTP Vendor Extensions*", Network Working Group, RFC 2132, Mar. 1997, pp. 1-20.

R. Droms, "*Dynamic Host Configuration Protocol*", Network Working Group, RFC 1541, Oct. 1993, pp. 1-14.

W. Wimer, "*Clarifications And Extensions For The Bootstrap Protocol*", Network Working Group, RFC 1542, Oct. 1993, pp. 1-17.

W. Simpson, "*The Point-to-Point Protocol (PPP)*", Network Working Group, RFC 1661, Jul. 1994, pp. 1-52.

R. Droms, "*Dynamic Host Configuration Protocol*", Network Working Group, RFC 2131, Mar. 1997, pp. 1-15.

R. Housley et al., "*Internet X.509 Public Key Infrastructure Certificate and CRL Profile*", Network Working Group, RFC 2459, Jan. 1999, pp. 1-129.

C. Adams et al., "*Internet X.509 Public Key Infrastructure Certificate Management Protocols*", Network Working Group, RFC 2510, Mar. 1999, pp. 1-72.

M. Myers et al., "*Internet X.509 Certificate Request Message Format*", Network Working Group, RFC 2511, Mar. 1999, pp. 1-4.

S. Boeyen et al., "*Internet X.509 Public Key Infrastructure Operational Protocols—LDAPv2*", Network Working Group, RFC 2559, Apr. 1999, pp. 1-13.

Rigney et al., "*Remote Authentication Dial In User Service (RADIUS)*", Network Working Group, RFC 2138, Apr. 1997, pp. 1-65.

"Cable Modem to Customer Premise Equipment Interface Specification (Interim) SP-CMCI-102-980317", Multimedia Cable Network Systems (MCNS) Holdings, L.P., Cable Television Laboratories, Inc., 1998, pp. ii to 40.

"Operations Support System Interface Specification Baseline Privacy Interface MIB (Interim Specification) SP-OSSI-BPI-101-980331", MCNS Holdings, L.P., 1997 and 1998, pp. ii to 33.

"Cable Modem Termination System-Network Side Interface Specification (Interim Specification) SP-CMTS-NS1101-960702", MCNS Holdings, L.P., 1996, pp. ii to 13.

"Removable Security Module Interface Specification (Interim Specification) SP-RSMI-101-980204", MCNS Holdings, L.P., Cable Television Laboratories, Inc., 1997, pp. ii to 47.

"Baseline Privacy Interface Specification (Interim) SP-BP1-101-970922", MCNS Holdings, L.P., 1997, pp. ii to 65.

"Operations Support System Interface Specification (Interim) SP-OSSI101-970403", MCNS Holdings, L.P., 1997, pp. 1 to 30.

"Radio Frequency Interface Specification (Interim Specification) SP-RFI-102-971008", MCNS Holdings, L.P., 1997, pp. ii to 186.

"Cable Modem Telephony Return Interface Specification (Interim) SP-CMTRI-101-970804", MCNS Holdings, L.P., Cable Television Laboratories, Inc., 1997, pp. ii to 73.

"Security System Specification (Interim Specification) SP-SSI-101-970506", MCNS Holdings, L.P., 1997, pp. ii to 103.

"Internet Engineering Task Force", Request for Comments 2131, Dynamic Host Configuration Protocol (DHCP), Mar. 1997, pp. 1 to 42.

S. Adiraju, J. Fijolek, IPCDN Telephony Return MIB, Internet Engineering Task Force, Internet Draft, "<draft-ietf-ipcdn-tri-mib-00.1.txt>," Mar. 1998, pp. 1 to 26.

Kyees, P.J. et al., *ADSL: A New Twisted-Pair Access to the Information Highway,* IEEE Communications Magazine, vol. 33, Issue 4, Apr. 1995, pp. 52-60.

Huang, Yin-Hwa et al., *Design of an MPEG-Based Set-Top Box for Video on Demand Services, Acoustics,* Speech and Signal Processing, 1995, ICASSP-95. 1995 International Conference. vol. 4, ISBN: 0-7803-2431-5, May 9-12, 1995, pp. 2655-2658.

"A Solutiion for the Priority Queue Problem of Deadline-Ordered Service Disciplines," N.R. Figueira, IEEE International Conference on Computer Communications and Networks, Sep. 22-25, 1997, pp. 320-325.

"Radio Frequency Interface Specification (Interim Specification) SP-RFI-104-980724", MCNS Holdings, L.P., 1997, pp. ii to 196.

"Radio Frequency Interface Specification (Interim Specification) SP-RFI-105-991105", MCNS Holdings, L.P., 1999, pp. ii to 202.

"Radio Frequency Interface Specification (Interim Specification) SP-RFIv1.1-106-001215", MCNS Holdings, L.P., 2000, pp. ii to 432.

Droms, R., *Dynamic Host Configuration Protocol,* Request for Comments 1541, Oct. 1993, pp. 1 to 31.

RFC 791, *Internet Protocol, DARPA Internet Program Protocol Specification,* Sep. 1981, pp. 1-37.

Postel, J., *Internet Protocol, DARPA Internet Program Protocol Specification,* RFC 792, Sep. 1981, pp. 1-14.

Postel, J., *User Datagram Protocol,* RFC 768, Aug. 28, 1980, pp. 1-3.

RFC 793, *Transmission Control Protocol, DARPA Internet Program Protocol Specification,* Sep. 1981, pp. 1-68.

Case, J. et al., *A Simple Network Management Protocol (SNMP),* RFC 1157, May 1990, pp. 1-26.

Sollins, K., *The TFTP Protocol (Revision 2)*, RFC 1350, Jul. 1992, pp. 1-9.

Alexander, S., *DHCP Options and BOOTP Vendor Extensions,* RFC 2132, Mar. 1997, pp. 1-37.

"Radio Frequency Interface Specification (Interim Specification) SP-RFIv1.1-I03-991105", MCNS Holdings, I.P., 1999, pp. li to 366.

\* cited by examiner

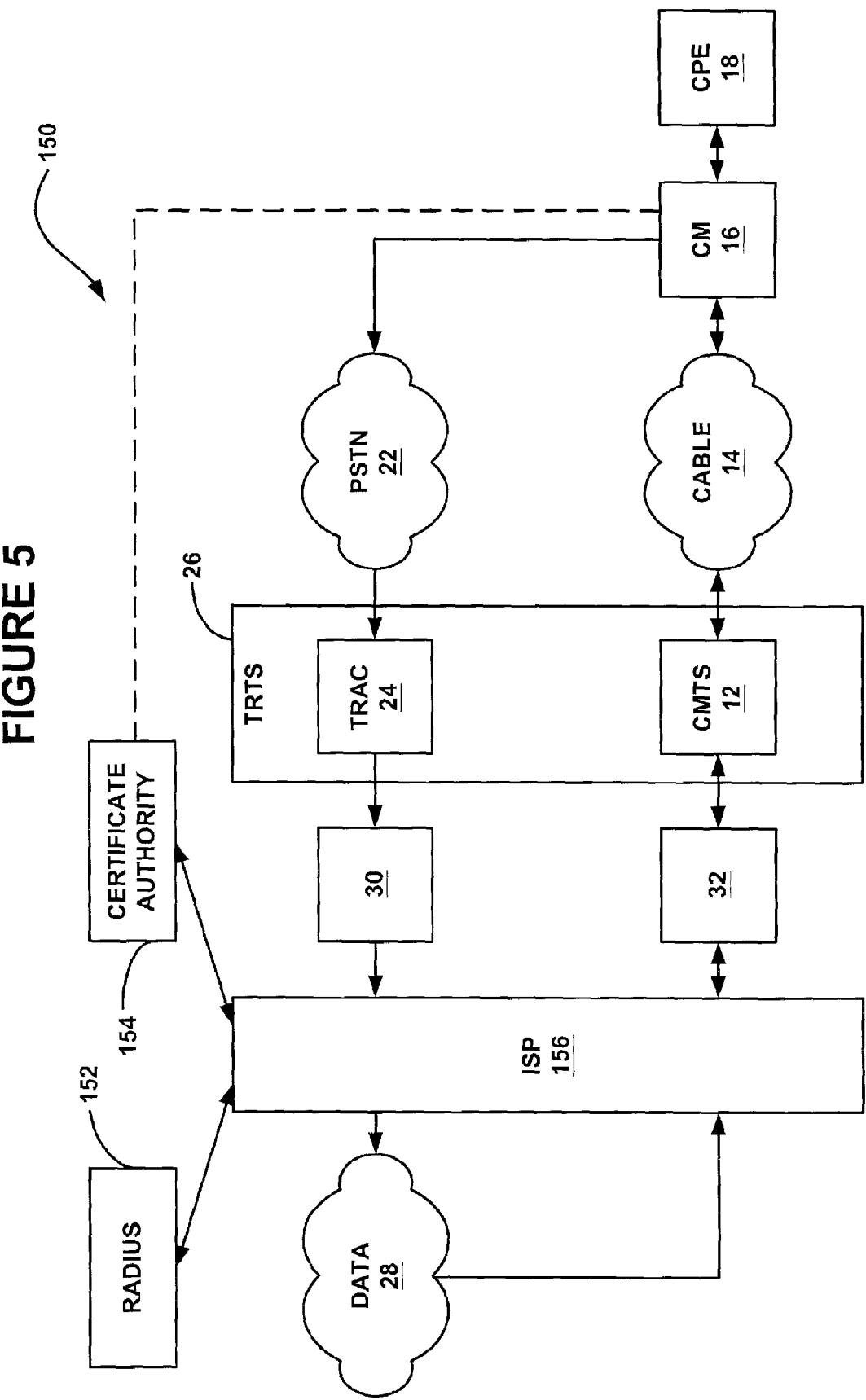

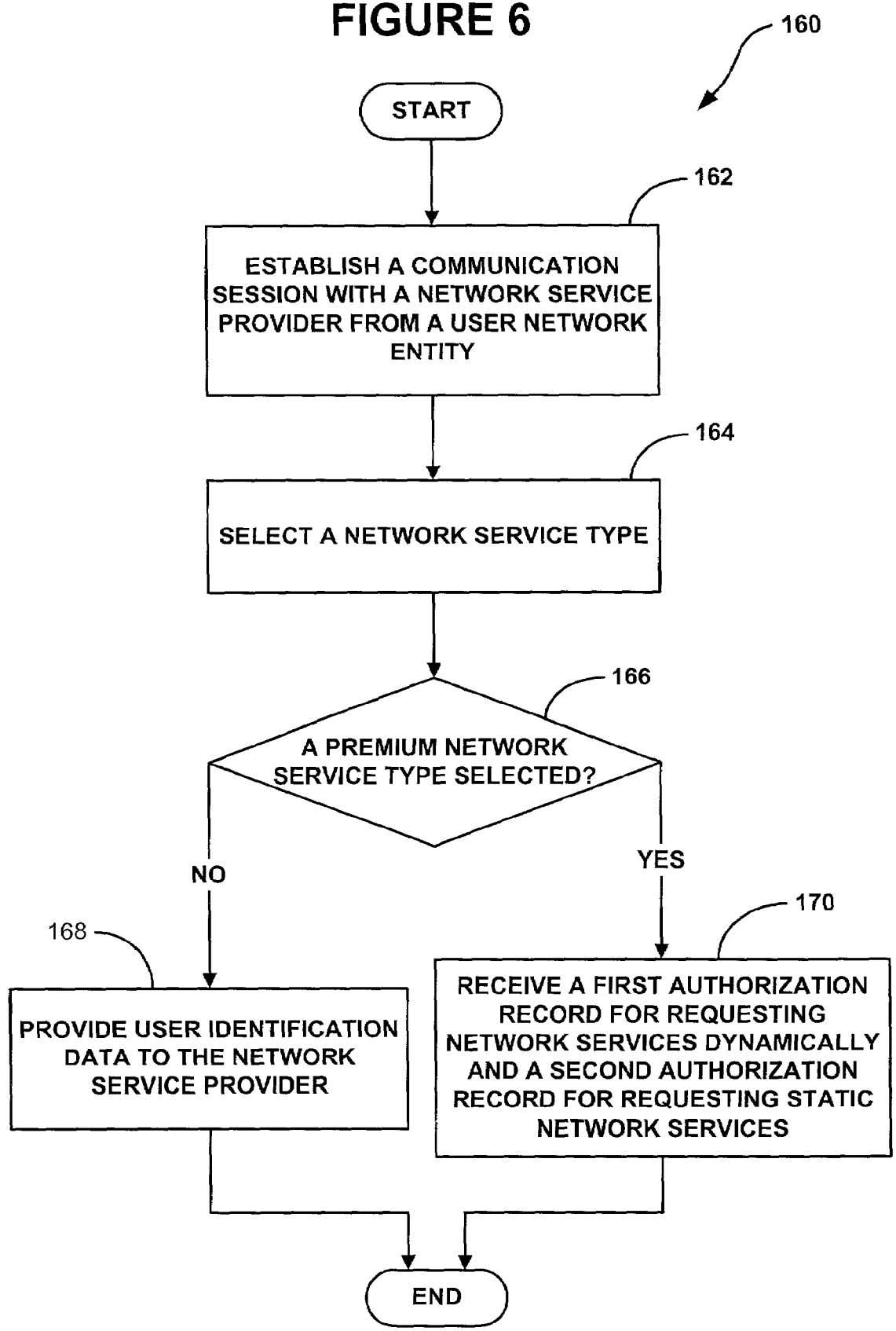

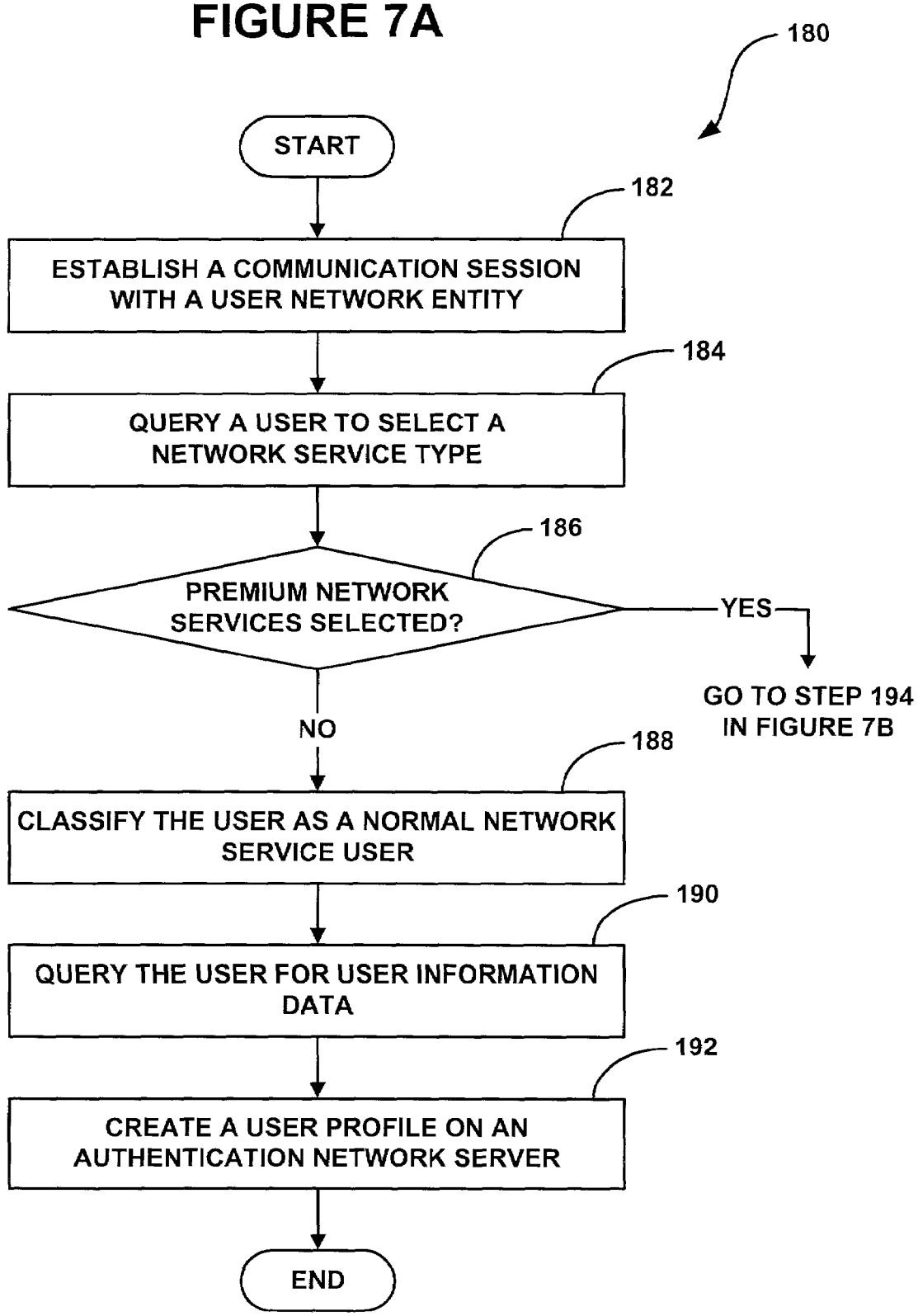

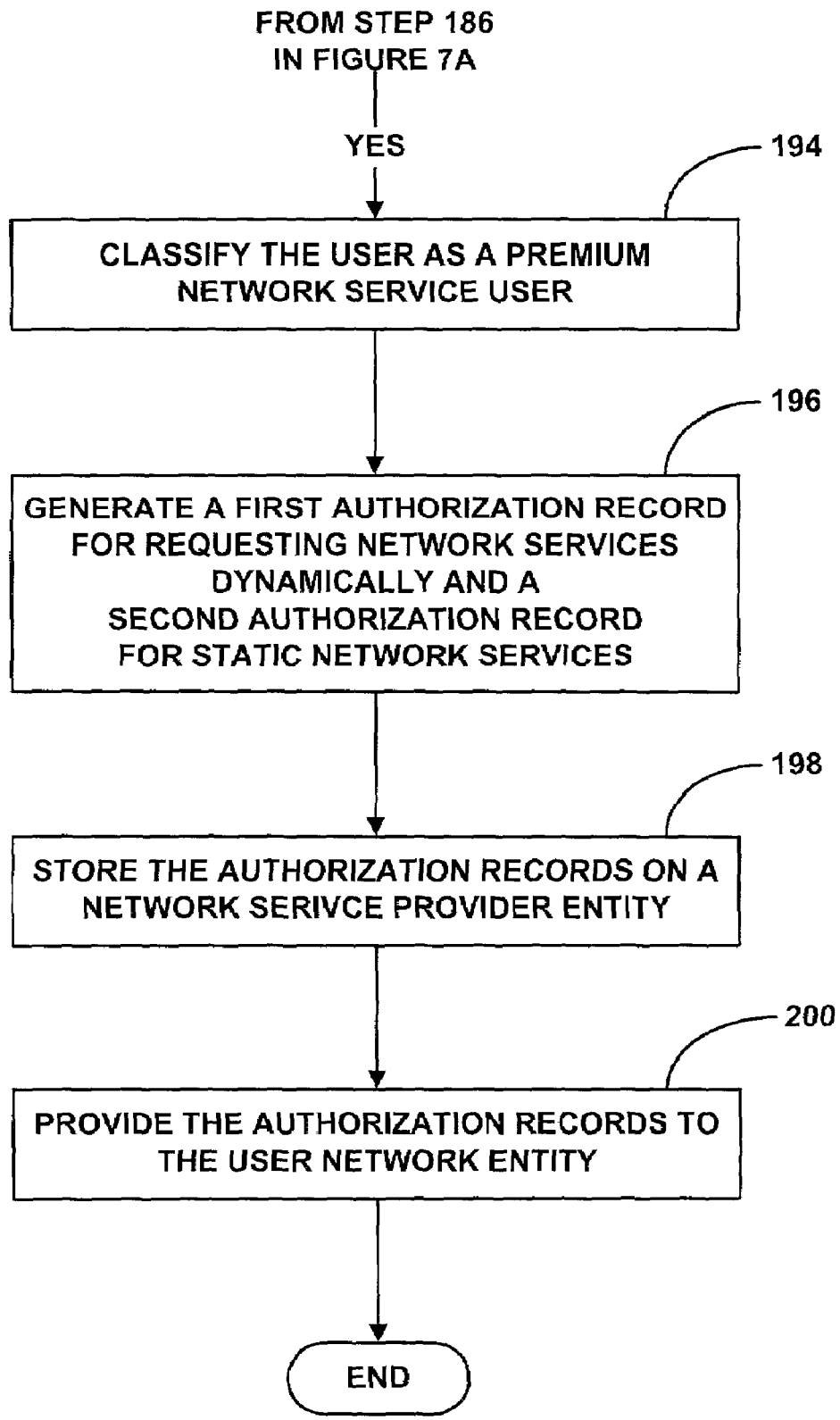

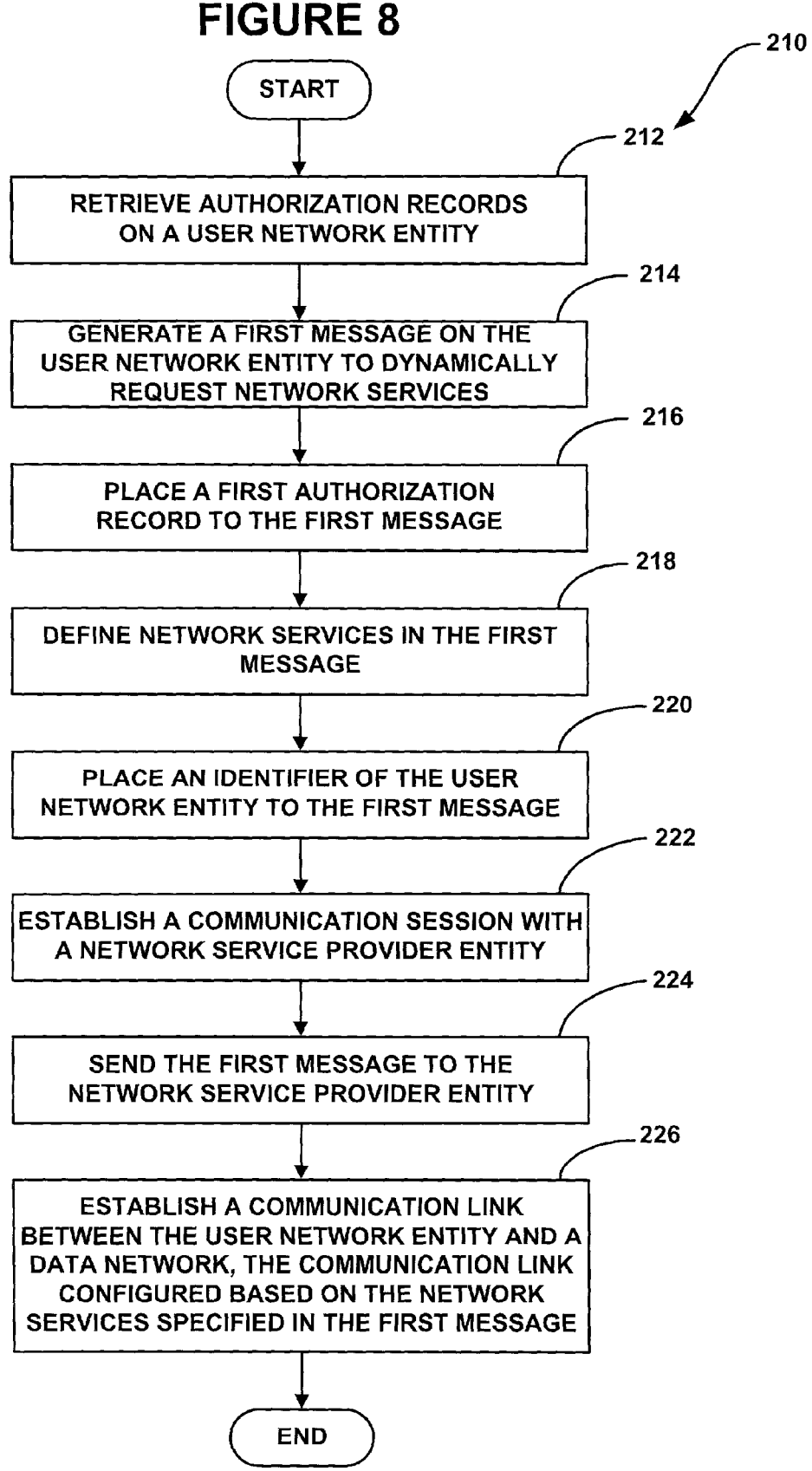

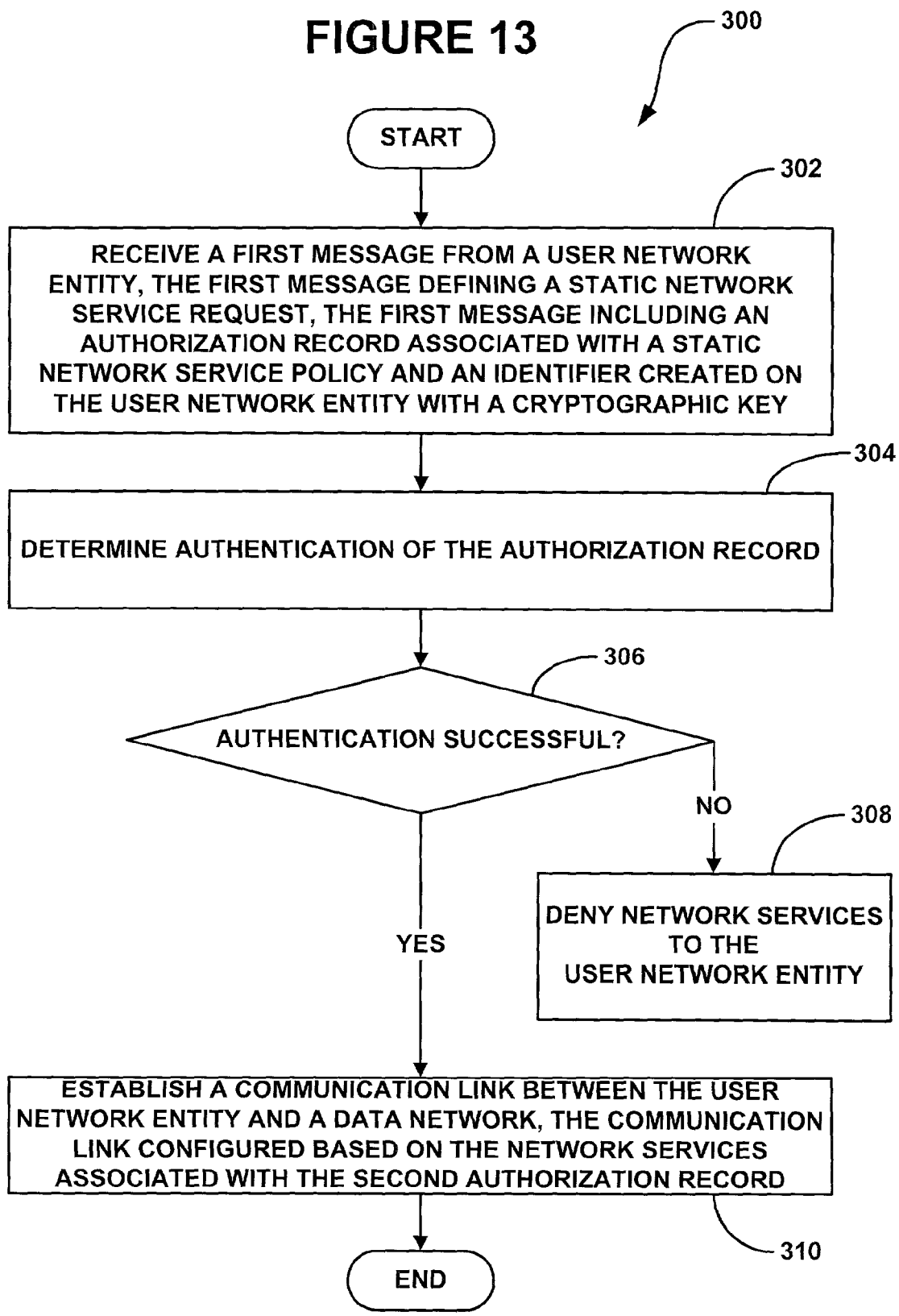

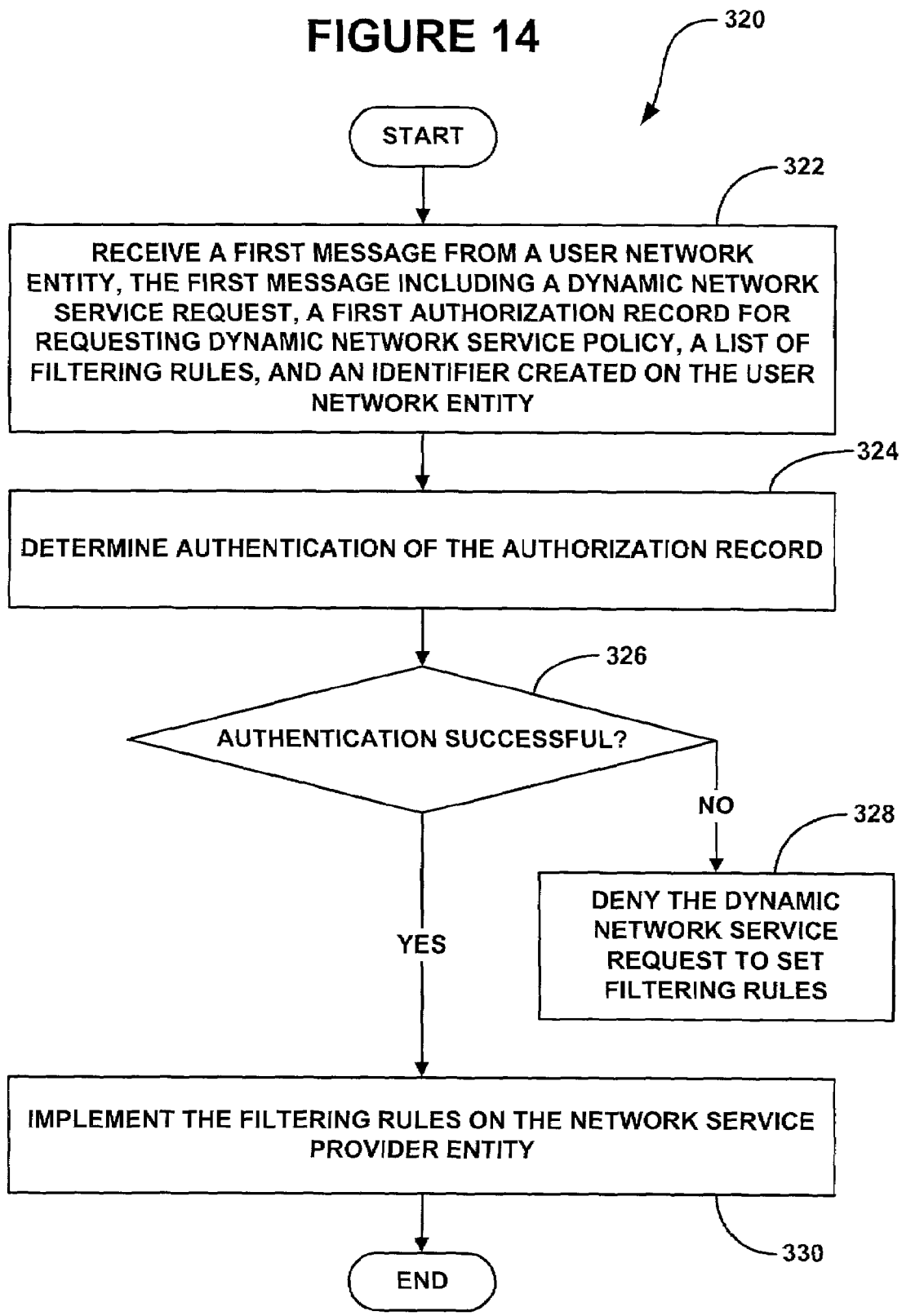

SYSTEM AND METHOD FOR PROVIDING DISTRIBUTED AND DYNAMIC NETWORK SERVICES FOR REMOTE ACCESS SERVER USERS

FIELD OF THE INVENTION

The present invention relates to communications in computer networks. More particularly, it relates to providing dynamic services to Remote Access Server ("RAS") users.

BACKGROUND OF THE INVENTION

Cable television networks such as those provided by Comcast Cable Communications, Inc., of Philadelphia, Pa., Cox Communications of Atlanta Ga., Time-Warner Cable, of Marietta Ga., Continental Cablevision, Inc., of Boston Mass., and others, provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to 30+ Mbps.

The Internet, a world-wide-network of interconnected computers, provides multi-media content including audio, video, graphics and text that requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others that are much slower than the about 10 Mbps, to 30+Mbps available on a coaxial cable or HFC cable system on a cable television network. Further, the ISPs allow customers to connect to the Internet via other types of connections, such as a Digital Subscriber Line ("DSL") connection providing data transmission rates from 512 kbps to 1.544 Mbps downstream and about 128 kbps upstream, or an Asymmetric Digital Subscriber Line ("ADSL") connection providing data transmission rates up to 6.1 Mbps downstream and 640 kbps upstream.

With the explosive growth of the Internet, many customers have desired to use the larger bandwidth of a cable television network to connect to the Internet and other computer networks. Cable modems, such as those provided by 3Com Corporation of Santa Clara, Calif., Motorola Corporation of Arlington Heights, Ill., Cisco Corporation of San Jose, Calif., Scientific-Atlanta, of Norcross, Ga., and others, offer customers higher-speed connectivity to the Internet, an intranet, Local Area Networks ("LANs") and other computer networks via cable television networks. These cable modems currently support a data connection to the Internet and other computer networks via a cable television network with a data rate of up to 30+ Mbps, which is a much larger data rate than can be supported by a modem used over a serial telephone line.

Many cable television networks provide bi-directional cable systems, in which data is sent "downstream", from a "headend" to a customer, as well as "upstream", from the customer back to the headend. The cable system headend is a central location in the cable television network and, further, is responsible for sending cable signals in the downstream direction and receiving cable signals in the upstream direction. An exemplary data-over-cable system with RF return typically includes customer premises equipment entities such a customer computer, a cable modem, a cable modem termination system, a cable television network, and a data network such as the Internet.

Some cable television networks provide only uni-directional cable systems, supporting only a "downstream" data path, which provides a path for flow of data from a cable system headend to a customer. A return data path via a telephone network, such as a public switched telephone network provided by AT&T and others, (i.e., a "telephone return") is typically used for an "upstream" data path, which provides a path for flow of data from the customer back to the cable system headend. A cable television system with an upstream connection to a telephone network is typically called a "data-over-cable system with telephony return."

An exemplary data-over-cable system with a telephony return typically includes customer premise equipment ("CPE") entities (such as a customer computer or a Voice over Internet Protocol ("VoIP") device), a cable modem, a cable modem termination system, a cable television network, a public switched telephone network, a telephone remote access concentrator, and a data network (e.g., the Internet). The cable modem termination system and the telephone remote access concentrator combined are called a telephone return termination system.

If the customer premises equipment entity comprises a telephone or a device capable of sending and receiving video or voice signals, the cable modem has to be capable of sending and receiving such signals. In such cases, the cable modem typically comprises an internal media terminal adapter, which provides a network interface functionality that accepts analog voice inputs or video signal and generates IP packets using the Real Time Transport Protocol, for instance.

In a bi-directional cable system, when the cable modem termination system receives data packets from the data network, the cable modem termination system transmits received data packets downstream via the cable television network to a cable modem attached to a customer premises equipment entity. The customer premises equipment entity sends response data packets to the cable modem, which sends the response data packets upstream via the cable network. The cable modem termination system sends the response data packets back to the appropriate host on the data network.

In the case of a telephony return system, when a cable modem termination system receives data packets from a data network, the cable modem termination system transmits the received data packets downstream via a cable television network to a cable modem attached to a customer premises equipment entity. The customer premises equipment entity sends response data packets to the cable modem, which sends response data packets upstream via a public switched telephone network to a telephone remote access concentrator. Next, the telephone remote access concentrator sends the response data packets back to the appropriate host on the data network.

When a cable modem used in a cable system is initialized, the cable modem establishes a communication link to a cable modem termination system via a cable network and, in telephony return data-over-cable systems to a telephone return termination system via a public switched telephone network. As the cable modem is initialized, the cable modem initializes one or more downstream channels via the cable network. Also upon initialization, the cable modem receives a configuration file (a boot file) from a configuration server via a trivial file-transfer protocol ("TFTP") exchange process.

The configuration file may include a plurality of configuration parameters encoded in a type-length-value format ("TLV"), for instance. The configuration file may comprise a plurality of Class-of-Service ("CoS") and Quality-of-Service ("QoS") parameters. The Class of Service parameters include, for example, maximum allowed data rates, minimum reserved data rate, maximum latency and a plurality of other parameters. The Quality of Service parameters include, for example, parameters defining delays expected to deliver data to a specific destination, a level of protection from unauthorized monitoring or modification of data, an expected residual error probability, a relative priority associated with data and a plurality of other parameters.

Managing dispersed serial lines and cable modem pools for a large number of users create a need for a significant administrative support. Since cable modems provide by definition a link to the outside word for many customer premise equipment entities associated with each cable modems, cable modem users require careful attention in terms of security and authentication. As is known in the art, a Remote Authentication Dial-In User Service ("RADIUS") provides means that allows Internet Service Providers to authenticate a user, and then return all configuration information necessary for the Internet Service Provider to provide network services to the user. RADIUS typically uses distributed client/server architecture, in which a Network Access Server ("NAS") is a client, and a RADIUS server holds and delivers authentication and profile information. In a typical system, a network access server is responsible for passing user information such as a username and a password to one or more designated RADIUS servers, and then acting on the response that is returned from the RADIUS servers.

When a network access server is configured to use RADIUS servers, any user of the network access server presents authentication information data to the network access server. As is known in the art, when a user tries to establish a communication link with its network access server, the user may be queried with a customized login prompt to enter authentication information data such as a username and a password. Once the network access server obtains the authentication information data from the user, the network access server may decide to send a message to a RADIUS server in order to authenticate the user. Once the RADIUS server receives the request, it may consult its database of users to find the user whose name matches the request. A user entry in the database may contain a list of requirements that must be met to allow network access for the user. The list of requirements, among many other parameters, typically includes a password associated with each user. If all conditions in the list of requirements are met, the RADIUS server may place a list of attribute values in a response message to the network access server. As is known in the art, the list of attribute values defines a service profile specific to the user for the duration of the access session.

Thus, as is known in the art, services offered to RADIUS users are static, and, in a typical scenario described in a proceeding paragraph, when a user dials up to a selected Internet Service Provider ("ISP"), the ISP provides network services based on a user profile received from a RADIUS server. However, as a diversity of network applications grows, static systems may not meet network requirements of many users. In the present scenario, the dial-up users may not request network services dynamically, and the current system architecture is centralized, as the user profiles are stored in a centralized location of the RADIUS.

There have been attempts to create systems having distributed architecture allowing secure communications between network devices including "Method and system for locating network services with distributed network address translation," U.S. Pat. No. 6,055,236 by Nessett et. al. However, the U.S. Pat. No. 6,055,236 relates to providing security services on an internal distributed network address translation network, and do not solve the centralized architecture problem associated with the RADIUS server users.

Therefore, it is desirable to develop a system and method for providing dynamic services for remote access users.

SUMMARY OF THE INVENTION

In accordance with preferred embodiments of the present invention, some of the problems associated with providing secure and dynamic network services on a distributed system are overcome.

One aspect of the invention includes methods and system for providing dynamic network services for users in a distributed system. In one embodiment, a user may receive a digital certificate from a network service provider and use the digital certificate for requesting dynamic network services in a secure manner from one or more network service providers. In another embodiment, the user may receive a second digital certificate associated with a prepaid bandwidth card. The methods and system may help provide distributed system architecture for remote access users in a secure manner.

These as well as other aspects and advantages of the present invention will become more apparent to those of ordinary skill in the art by reading the following detailed description, with reference to the accompanying drawings.

BRIEF DESCRIPTION OF THE DRAWINGS

Exemplary embodiments of the present invention are described with reference to the following drawings, in which:

FIG. 5 is a block diagram illustrating a data-over-cable system in which exemplary embodiments may be applied;

FIG. 6 is a flow chart illustrating an exemplary method for configuring user network entities based on a network service type selected by a user;

FIGS. 7A and 7B are a flow chart illustrating a method for classifying a user network entity to a predetermined network user type on a network service provider entity;

FIG. 8 is a flow chart illustrating an exemplary method for requesting dynamic network services according to one embodiment;

FIG. 13 is a flow chart illustrating a method for providing static network services on a network service provider entity; and FIG. 14 is a flow chart illustrating a method for dynamically setting filtering rules on a network service provider by a user network entity.

DETAILED DESCRIPTION OF AN EXEMPLARY EMBODIMENT

Exemplary Data-Over-Cable System

Figure 1:
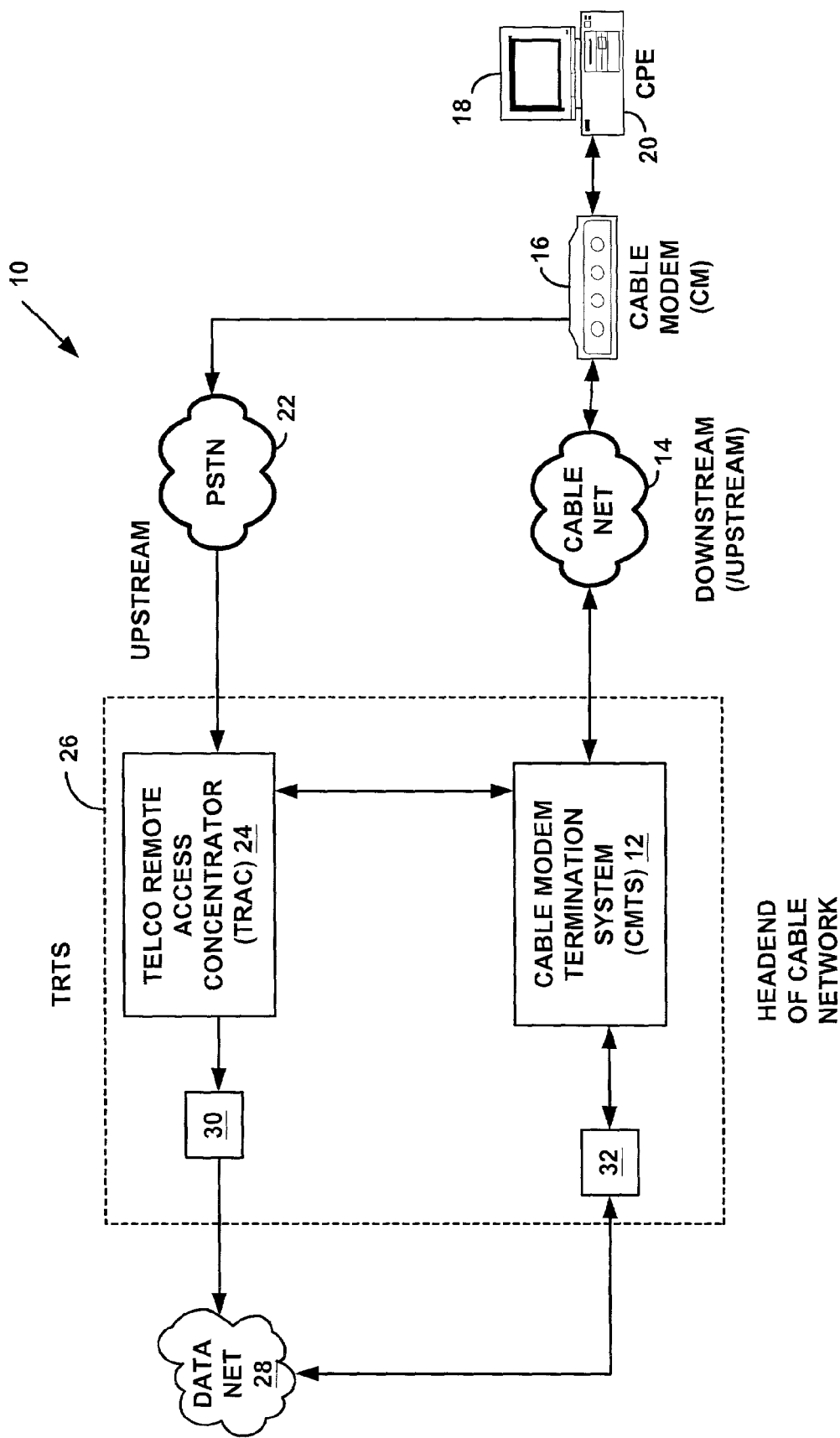
FIG. 1 is a block diagram illustrating a cable modem system.

FIG. 1 is a block diagram illustrating an exemplary data-over-cable system 10. The data-over-cable system 10 may be a bi-directional cable system supporting a downstream data flow and an upstream data flow to and from a cable television network "headend" from and to a customer premises equipment entity such as a personal computer, for instance. The cable television network "headend" is a central location responsible for sending cable signals in a downstream direction and an upstream direction. In a bi-directional cable system, customer premises equipment entities or a cable modem may have an upstream connection to a cable modem termination system via a cable television connection, a wireless connection, a satellite connection or a different connection by which the cable modem may send data upstream to the cable modem termination system.

Alternatively, the data-over-cable system 10 may be a uni-directional cable system supporting only a downstream data path from a cable television network headend to a customer premises equipment entity, such as a personal computer. In the uni-directional cable system, a return path is typically established via a telephone network ("telephone return"), which provides an "upstream" data path from the customer premises equipment back to the cable television network "headend". In a unidirectional cable system, a cable modem may comprise an integral telephone modem for connecting to a Public Switched Telephone Network ("PSTN") such as a PSTN 22, and the integral telephone modem may be connected to the cable modem for exchanging data.

The data-over-cable system 10 includes a Cable Modem Termination System ("CMTS") 12 connected to a cable television network 14, hereinafter, a cable network 14. FIG. 1 illustrates one CMTS 12. However, the data-over-cable system 10 may include multiple CMTS 12. Further, according to an exemplary embodiment, the CMTS 12 and any other network entities that will be described in the following paragraphs may be duplicated in a serial or a parallel arrangement to provide a back-up system in case of a primary network device's failure.

In the exemplary embodiment of the present invention, the CMTS 12 may be a Total Control hub by 3Com Corporation of Santa Clara, Calif., with a cable modem termination unit. A Total Control hub is a chassis with multiple networking cards connected by a common bus. However, the CMTS 12 could also be another network server such as a CMTS by Cisco Systems of San Jose, Calif., or other.

The cable network 14 may be a cable television network such as one provided by Comcast Cable Communications, Inc., of Philadelphia, Pa., Cox Communications of Atlanta, Ga., or Time-Warner Cable, of Marietta, Ga., or other.

A cable modem ("CM") 16 is connected to the cable network 14 with a downstream cable connection. The cable modem may be provided by 3Com Corporation of Santa Clara, Calif., or Motorola Corporation of Arlington Heights, Ill., or other.

Network devices for exemplary embodiments of the present invention include network devices that can interact based on standards proposed by the Data-Over-Cable-Service-Interface-Specification ("DOCSIS") standards from the Multimedia Cable Network Systems ("MCNS"), the Institute of Electrical and Electronic Engineers ("IEEE"), International Telecommunications Union-Telecommunication Standardization Sector ("ITU"), Internet Engineering Task Force ("IETF"), and/or Wireless Application Protocol ("WAP") Forum. However, network devices based on other standards could also be used. DOCSIS standards can be found on the World Wide Web at the Universal Resource Locator ("URL") "www.cablemodem.com." IEEE standards can be found at the URL "www.ieee.org." The ITU, (formerly known as the CCITT) standards can be found at the URL "www.itu.ch." IETF standards can be found at the URL "www.ietf.org" The WAP standards can be found at the URL "www.wapforum.org." However, the present invention is not limited to these standards, and any other presently existing or later developed standards could also be used.

Further, the data-over-cable system 10 may be Packet Cable specifications compliant. The Packet Cable standards may be found on the World Wide Web at the URL "www-.packetcable.com." The Packet Cable specifications define mechanisms required for supporting voice and video transmission over cable systems. If the data-over-cable system 10 is Packet Cable specification compliant, the CM 16 may comprise an internal media terminal adapter, or a media terminal adapter may otherwise be provided in communications with the CM 16. The media terminal adapter may provide network interface functionality for transmitting voice or video signals and for converting analog voice inputs or video signals to IP packets using, for instance, the Real Time Transport protocol.

Furthermore, if the data-over-cable system 10 is Packet Cable Specification compliant, the data-over-cable system 10 may include a plurality of additional network devices such as a call management server and a gate controller, for instance. The call management server may enable the media terminal adapter to establish multimedia sessions including voice communications applications such as "IP telephony" or "VoIP". The gate controller may be used to perform authorization and authentication checks for users attempting to connect to the CMTS 12.

FIG. 1 illustrates one CM 16 connected to the CMTS 12. However, typical data-over-cable systems include tens or hundreds of thousands of CMs 16 connected to the CMTS 12. In addition, as shown in FIG. 1, the CM 16 is connected to a CPE entity 18 such as a personal computer system, a VoIP device or a telephone, for instance. The CM 16 may be connected to the CPE entity 18 via a Cable Modem-to-CPE Interface ("CMCI") 20. FIG. 1 illustrates one CPE entity 18. However the CM 16 is typically coupled to multiple CPE entities.

If the data-over-cable system 10 is a bi-directional data-over-cable system, the CM 16 may have an upstream and downstream connection to the CMTS 12 via a cable television connection, a wireless connection or a satellite connection, for instance. FIG. 1 illustrates an exemplary upstream and downstream connection to the CMTS 12 via the cable network 14. In such an embodiment, the CMTS 12 may still provide data from the PSTN 22 to the CM 16 or the CPE entity 18.

In a downstream direction of a bi-directional data-over-cable system, a cable system typically has a passband with a lower edge between 50 MHz and 54 MHz and an upper edge between 300 MHz to 864 MHz. However, the dataover-cable system 10 is not limited to such frequencies, and frequencies in data-over-cable system may be implementation dependent. In the upstream direction, the cable system may have an operating frequency passband range from 5 MHz to 30 MHz or 5 MHz to 40 MHz, for instance.

As mentioned above, the cable system 10 may be a unidirectional cable system. In a unidirectional cable system, the CM 16 is connected to the PSTN 22 or other such network, which provides an upstream telephone connection. The upstream telephone connection may be a standard telephone line connection such as an Integrated Services Digital Network ("ISDN") connection, an Asymmetric Digital Subscriber Line ("ADSL") connection or a wireless connection, for instance.

In that arrangement, the PSTN 22 may be connected to a Telephone Remote Access Concentrator ("TRAC") 24. In the data-over-cable system having an upstream telephone connection, the TRAC 24 may be a Total Control telephone hub by 3Com Corporation of Santa Clara, for instance. However, the TRAC 24 could also be a telephone hub manufactured by a different company, or could take still other forms.

The combination of the CMTS 12 and the TRAC 24 is called a "Telephone Return Termination System" ("TRTS") 26. The TRTS 26 is illustrated as a dashed box in FIG. 1. The CMTS 12 and the TRAC 24 may be at a "headend" of the cable system 10. Alternatively, for instance, the TRAC 24 may be located in a different location and may have routing associations with the CMTS 12. The cable system 10 may also include a plurality of servers such as operations servers, administrative servers or maintenance servers (not shown). Further, the CMTS 12 may connect a plurality of access points to the data-over-cable system 10. Additionally, the plurality of access points may be connected to cable headend access points. Such configurations may be "one-to-one", "one-to-many", or "many-to-many", and may be interconnected to other Local Area Networks ("LANs") or Wide Area Networks ("WANs").

The data-over-cable system 10 may comprise a plurality of network interfaces. As shown in FIG. 1, the TRAC 24 is connected to a data network 28 (e.g. the Internet, an intranet, a LAN or a WAN, for instance) via a TRAC-Network System Interface 30 ("TRAC-NSI"). The CMTS 12 is connected to the data network 28 via a CMTS-Network System Interface ("CMTS-NSI") 32.

Further, the data-over-cable system 10 may comprise a policy/authorization server in communication with the CMTS 12. The authorization/policy server may manage overall policies with an administrative domain such as an Internet service provider, for instance. The CMTS 12 may also comprise an internal authorization module that may serve as a policy enforcement point, for instance.

The system 10 may also comprise a bandwidth manager in communication with the CMTS 12. The bandwidth manager may detect network trends, measure network response time, generate CoS and QoS reports, allocate bandwidth and/or keep records of allocated and available bandwidth.

The present invention is not limited to the use within the data-over-cable system illustrated in FIG. 1. More, fewer, different or equivalent components, connections and interfaces could also be used. Further, the arrangements described herein are shown for purposes of illustration only, and those skilled in the art will appreciate that other arrangements and other elements, such as interfaces or functions, whether or not known in the art, can be used instead, and some elements may be omitted altogether. Additionally, as in most communications applications, those skilled in the art will appreciate that many of the elements described herein are functional entities that may be implemented as discrete components or in conjunction with other components, in any suitable combination and location.

Further, as mentioned above, network entities in the data-over-cable system 10 may be duplicated to provide a back-up in case of failure of one or more network entities. For instance, the network entities may be duplicated in parallel or in series. In a parallel arrangement, for instance, the CMTS 12 comprising an internal authorization/policy server and an internal bandwidth manager may be duplicated. The CMTS 12 and a duplicated CMTS 12' (not shown) may operate simultaneously, with one of them active and the other one in a "standby" state. In such an arrangement, the two units may communicate using a "keep alive" signal, for instance. Thus, if the primary CMTS 12 fails, the redundant CMTS 12' may immediately start operating, and, ideally, there is no loss of service.

In another exemplary embodiment providing a back-up system, redundant units may operate in a serial manner. In the serial arrangement, units may be cross-connected with a heart-beat controlled shunt on ports. Further, in the serial arrangement, both units may be active, as opposed to a primary device being in an active state and a redundant device being in a standby state, as in the parallel arrangement. In another exemplary embodiment of the present invention, any individual integral components or groups of components may be duplicated.

An operating environment for each CMTS 12, CM 16, CPE 18, TRAC 24 and other network entities of an exemplary embodiment may include a processing system with at least one high speed processing unit and a memory system. In accordance with the practices of persons skilled in the art of computer programming, the present invention is described below with reference to acts and symbolic representations of operations or instructions that are performed by the processing system, unless indicated otherwise. Such acts and operations or instructions could be referred to as being "computer-executed", "processing unit executed", or the like.

It will be appreciated that the acts and symbolically represented operations or instructions include the manipulation of electrical signals by the processing unit. An electrical system with data bits causes a resulting transformation or reduction of the electrical signal representation, and the maintenance of data bits at memory locations in the memory system to thereby reconfigure or otherwise alter the processing unit's operation, as well as other processing of signals. The memory locations may be physical locations that could have particular electrical, magnetic, optical, or organic properties for maintaining data bits.

The data bits may also be maintained on a computer readable medium such as magnetic disks, optical disks, organic disks, and any other volatile or non-volatile mass storage system readable by the processing unit, for instance. The computer readable medium may include cooperating or interconnected computer readable media, which may exist exclusively on the processing system or may be distributed among multiple interconnected processing systems that may be local or remote to the processing system.

Network Device Protocol Stack

Figure 2:
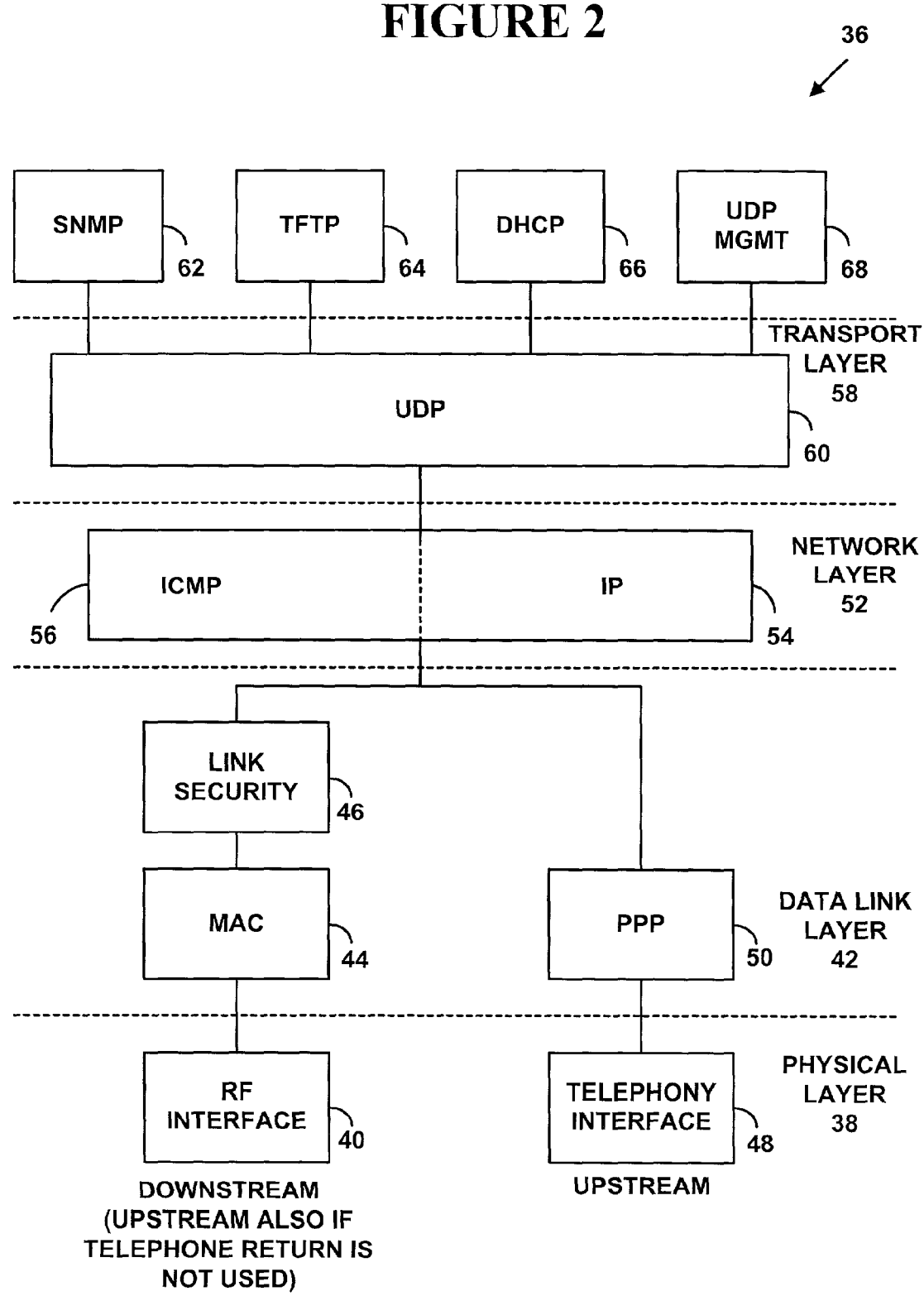
FIG. 2 is a block diagram illustrating a protocol stack for a data-over-cable system.

FIG. 2 is a block diagram illustrating an exemplary protocol stack 36 for network devices in the data-over-cable system 10. In an exemplary embodiment of the present invention, network entities in the data-over-cable system 10 may be DOCSIS compliant. However, other standards may also be used, and the present invention is not limited to the DOCSIS compliant network entities.

FIG. 2 illustrates downstream and upstream protocols used in the CM 16, for instance. As known in the art, the Open System Interconnection ("OSI") model may be used to describe computer networks. The OSI model consists of seven layers including, from lowest to highest, a physical layer, a data-link layer, a network layer, a transport layer, a session layer, a presentation layer and an application layer. The physical layer transmits bits over a communication link. The data-link layer transmits error free frames of data. The network layer transmits and routes data packets.

In bi-directional data-over cable systems, the CM 16 is connected to the cable network 14 in a physical layer 38 via a Radio Frequency ("RF") Interface 40. In an exemplary embodiment of the present invention, for a downstream data transmission, the RF Interface 40 may have an operation frequency range of 50 Mega-Hertz ("MHz") to 1 Giga-Hertz ("GHz") and a channel bandwidth of about 6 to 8 MHz. However, other operation frequencies may also be used, and the invention is not limited to these frequencies. For an upstream transmission the RF Interface 40 may have an operation frequency range of about 5 MHz to 50 MHz. Further, the RF Interface 40 may use a signal modulation method, such as Quadrature Amplitude Modulation ("QAM"). As known in the art, the QAM is used as means for encoding digital information over radio, wire, or fiber optic transmission links. The QAM is a combination of amplitude and phase modulation and is an extension of a multiphase phase-shift-keying. The QAM may have any number of discrete digital levels typically including 4, 16, 64 or 256 levels. In an exemplary embodiment, QAM-64 may be used in the RF Interface 40. However, other operating frequencies and modulation methods could also be used, such as a Quadrature Phase Shift Keying ("QPSK") modulation, for instance. Further, the RF Interface 40 can also be used in a telephony return data-over-cable system.

In a data-over-cable system with a telephony return employed for an upstream connection, the CM 16 may be connected to the PSTN 22 in the physical layer via a telephone interface 48. In an exemplary embodiment, the telephony interface may operate in accordance with one of the standards of the International Telecommunications Union-Telecommunication ("ITU-T") Standardization Sector. The telephone interface 48 may use the ITU-T V.90 standard, for instance. As known in the art, the ITU-T V.90 standard is commonly used in a data link layer of modem communications, and it currently allows data rates as high as 55,600 bits-per-second ("bps"). However, the telephone interface 48 may also operate according to other communications standards, such as V.32 standard, V.34 standard or V.xx standard, where xx defines any later versions of the standard. Further, the telephone interface 48 could also be an Asymmetric Subscriber Link ("ADSL") interface, an Integrated Services Digital Network ("ISDN") interface or a wireless interface, for instance.

Above the RF Interface 40, there is a data link layer comprising a Medium Access Control ("MAC") layer 44. As known in the art, the MAC layer 44 controls access to a transmission medium via the physical layer 38. The MAC layer 44 may use a protocol described in IEEE 802.14. However, other MAC layer protocols could also be used, such MCNS MAC layer protocol, for instance. Above the MAC layer 44 may be a link security protocol stack 46. The link security protocol stack 46 prevents unauthorized users from making a data connection from cable network 14.

A Point-to-Point Protocol ("PPP") layer 50 is in the data link layer 42 and above the telephony interface 48. As known in the art, the PPP layer encapsulates network layer datagrams over a serial communication link. More information on the PPP protocol may be found on the World Wide Web at the URL "www.ietf.org" in a Request for Comments ("RFC"), RFC-1661.

A network layer 52 is above both the downstream protocol layer and the upstream protocol layer. The network layer 52 comprises an Internet Protocol ("IP") layer 54 and an Internet Control Message Protocol ("ICMP") layer 56. The IP layer 54 corresponds to the OSI layer 3, which is the network layer, but, typically, is not defined as part of the OSI model. As known in the art, the IP is a routing protocol designed to route traffic within a network or between networks. More information on the IP protocol may be found at the URL "www.ietf.org" in RFC-791. The ICMP layer 56 is used for network management. The ICMP provides a plurality of functions, such as an error reporting, reachability testing (e.g., "pinging"), congestion control, route-change notification and performance or subnet addressing, for instance. More information on the ICMP may be found at the URL "www.ietf.org" in RFC-792.

A transport layer 58 is above the network layer 52. The transport layer 58 comprises a User Datagram Protocol ("UDP") layer 60, which approximately corresponds to the OSI layer 4, the transport layer. As known in the art, the UDP provides a connectionless mode of communication with datagrams. More information on the UDP layer 60 may be found at the URL "www.ietf.org" in RFC-768. However, the transmission layer 58 is not limited to the User Datagram Protocol, and other protocols, such as a Transmission Control Protocol ("TCP"), could also be used. More information on the TCP may be found at the URL "www.ietf.org" in RFC-793.

Above the transport layer 58, there are a Simple Network Management Protocol ("SNMP") layer 62, a Trivial File Transfer Protocol ("TFTP") layer, a Dynamic Host Configuration Protocol ("DHCP") layer 66 and a UDP manager 68. The SNMP layer 62 is used to support network management functions. More information on the SNMP layer may be found at the URL "www.ietf.org" in RFC-1157. The TFTP layer 64 is a file transfer protocol, which is typically used to download files and configuration information. More information on the TFTP layer 64 may be found at the URL "www.ietf.org" in RFC-1350. The DHCP layer 66 is a protocol for passing configuration information to hosts on the IP network 54. More information on the DHCP layer 66 may be found at the URL "www.ietf.org" in RFC-1541, RFC-2131 and RFC-2132. The UDP manager 68 distinguishes and routes packets to an appropriate service. However, more, fewer, or different protocol layers could be used in the data-over-cable system 10.

According to an exemplary embodiment of the present invention, the CM 16 may support transmission and reception of IP datagrams as specified by RFC-791. The CM 16 may be also configured to filter IP datagrams with IP addresses assigned to the CM 16 or CPE 18. Further, the CMTS 12 and the TRAC 24 may also perform filtering of IP datagrams.

During the initialization of the CM 16, the CMTS 12 transmits to the CM 16 a Termination System Information ("TSI") message, which is a MAC management message. The CMTS 12 may use the TSI message to report to the CM 16 whether or not a bi-directional system is used, for instance. Further, the TSI message may be used to provide the CM 16 with information about the status of the CMTS 12.

Figure 3:
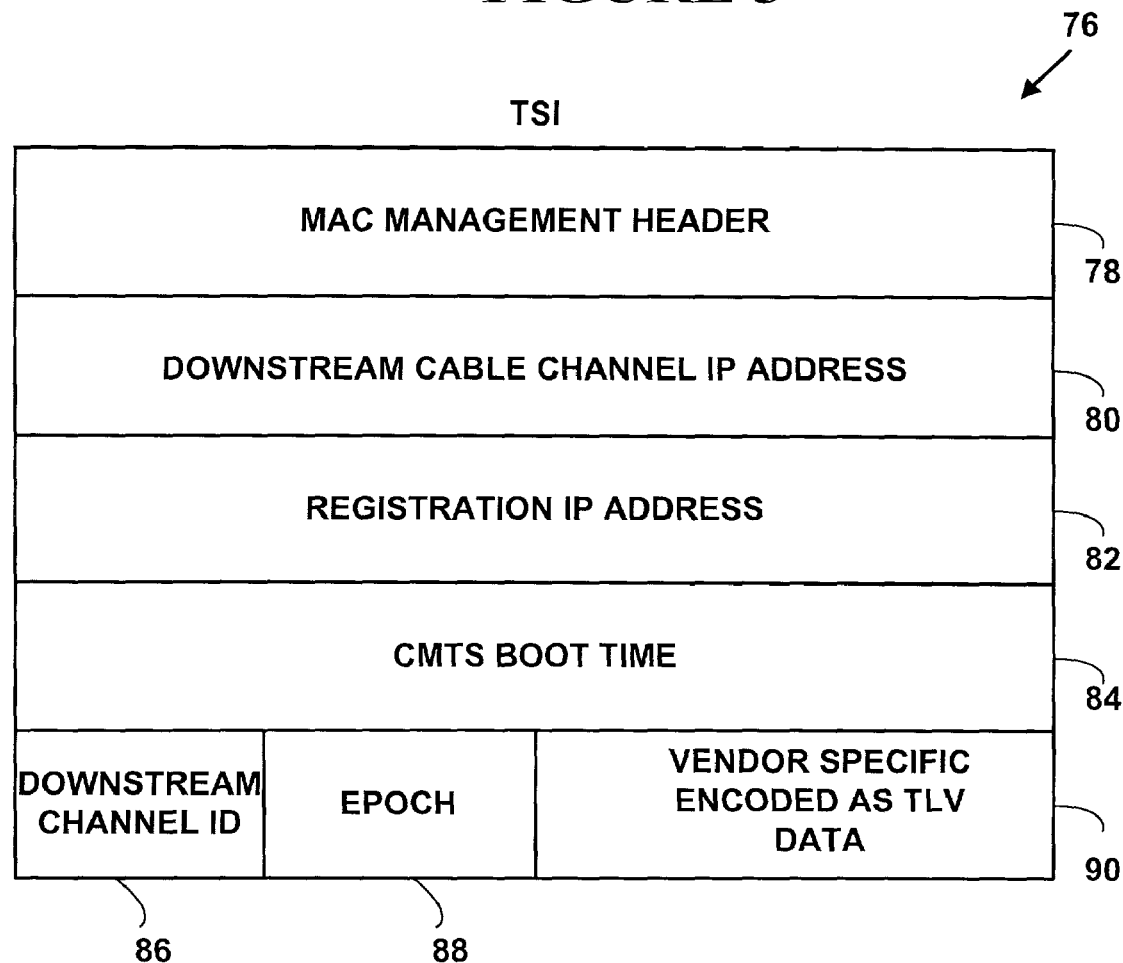
FIG. 3 is a block diagram illustrating a Termination System Information message structure.

FIG. 3 is a block diagram illustrating a structure of an exemplary TSI message 76. The TSI message structure 76 comprises a plurality of fields, such as a MAC management header 78, a downstream cable channel IP address 80, a registration IP address 82, a CMTS boot time 84, a downstream channel identifier 86, an epoch time 88 and vendor specific encoded data 90. However, the TSI message 76 is not limited to these fields, and more, fewer or different fields could also be used in the TSI message 76.

Further in a telephony return data-over-cable system, the CM 16 additionally receives from the CMTS 12 a Telephony Channel Descriptor ("TCD") message defining at least one telephone number that may be used on the CM 16 to establish a communication session with the Telco Remote Access Concentrator 24.

Additionally, during the initialization process, the CM 16 may initiate a Dynamic Host Configuration Protocol ("DHCP") process. The DHCP process is used to provide configuration parameters to hosts on a network such as an IP network, for instance. The DHCP process provides two main services to network clients such as CMs or CPE entities. First, during the DHCP process, IP network addresses are allocated to clients and, second, configuration parameters are provided for network entities.

Figure 4:
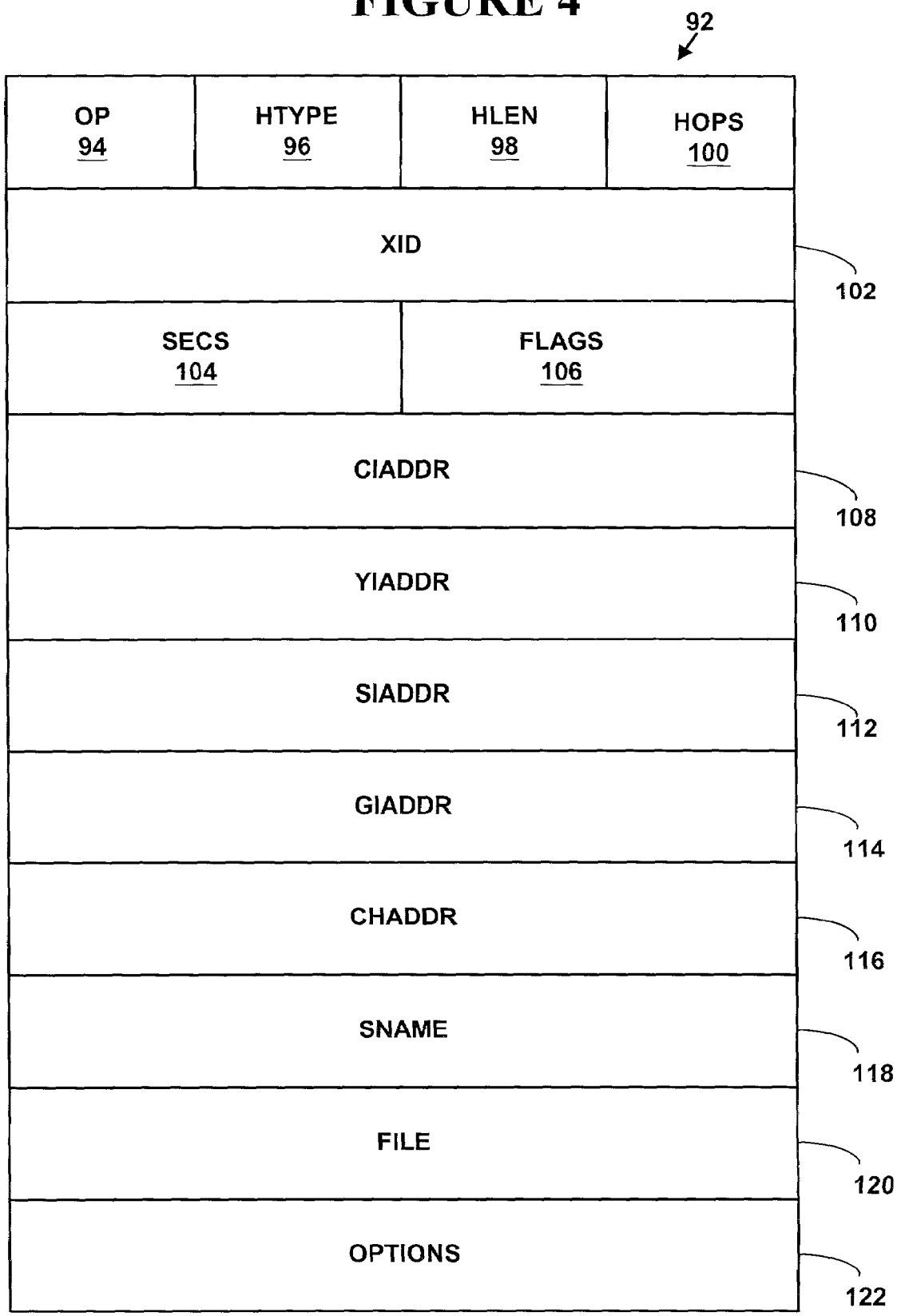
FIG. 4 is a block diagram illustrating a Dynamic Host Configuration Protocol message structure.

FIG. 4 is a block diagram illustrating an exemplary DHCP message structure 92. The format of the DHCP message structure 92 is based on a format of BOOTstrap Protocol ("BOOTP") messages described in RFC-951 and RFC-1542 that may be found at the URL "www.ietf.org" From a network host client's point of view, the DHCP is an extension of a BOOTP mechanism. This property allows the existing BOOTP clients to communicate with DHCP servers without requiring any changes to network host clients' BOOTP initialization software.

To capture a BOOTP relay agent behavior described as part of the BOOTP specification and to allow interoperability of existing BOOTP clients with DHCP servers, a DHCP server uses a BOOTP message format. Further, using the BOOTP relay agents eliminates the necessity of using a DHCP server on each physical network segment.

DHCP 66 message structure 92 includes an operation code field 94 ("op"), a hardware address type field 96 ("htype"), a hardware address length field 98 ("hlen"), a number of hops field 100 ("hops"), a transaction identifier field 102 ("xid"), a seconds elapsed time field 104 ("secs"), a flags field 106 ("flags"), a client IP address field 108 ("ciaddr"), a your IP address field 110 ("yiaddr"), a server IP address field 112 ("siaddr"), a gateway/relay agent IP address field 114 ("giaddr"), a client hardware address field 116 ("chaddr"), an optional server name field 118 ("sname"), a boot file name 120 ("file") and an optional parameters field 122 ("options"). Descriptions for an exemplary DHCP message 92 fields are shown in Table 1.

TABLE 1

| DHCP Parameter | Description |
| --- | --- |
| OP 94 | Message op code/message type. 1 = BOOTREQUEST, 2 = BOOTREPLY. |
| HTYPE 96 | Hardware address type (e.g., '1' = 10 Mps Ethernet). |
| HLEN 98 | Hardware address length (e.g. '6' for 10 Mbps Ethernet). |
| HOPS 100 | Client sets to zero, optionally used by relay-agents when booting via a relay-agent. |

TABLE 1-continued

| DHCP Parameter | Description |
| --- | --- |
| XID 102 | Transaction ID, a random number chosen by the client, used by the client and server to associate messages and responses between a client and a server. |
| SECS 104 | Filled in by client, seconds elapsed since client started trying to boot. |
| FLAGS 106 | Flags including a BROADCAST bit. |
| CIADDR 108 | Client IP address; filled in by client in DHCPREQUEST if verifying previously allocated configuration parameters. |
| YIADDR 110 | 'Your'(client) IP address. |
| SIADDR 112 | IP 54 address of next server to use in bootstrap; returned in DHCPOFFER, DHCPACK and DHCPNAK by server. |
| GIADDR 114 | Gateway relay agent IP 54 address, used in booting via a relay-agent. |
| CHADDR 116 | Client hardware address (e.g., MAC layer 44 address). |
| SNAME 118 | Optional server host name, null terminated string. |
| FILE 120 | Boot file name, terminated by a null string. |
| OPTIONS 122 | Optional parameters. |

The DHCP message structure 92 shown in FIG. 4 may be used to discover IP network host interfaces in the data-over-cable system 10. A network host client such as the CM 16 may use the DHCP process to dynamically acquire, verify or renew an IP address and configuration parameters. During a typical use of the DHCP process, the CM 16 and CPE 18 broadcast a "DHCPDISCOVER" mesage to receive configuration settings such as an IP address for the CM 16 and an IP address for the CPE 18. During the DHCP process, the DHCP servers may respond with DHCPOFFER messages including configuration parameters. Then, the CM 16 or the CPE 18 may select one of the DHCP servers and may send a DHCPREQUEST message to the selected server. Upon a receipt of the DHCPREQUEST message on the selected server, the server may generate a DHCPOFFER message including a configuration file name for the CM 16 and an IP address assigned to the CM 16. Once the CM 16 receives the configuration file name from the selected server, the CM 16 may initiate a TFTP exchange process to request a configuration file from a TFTP server associated with the TFTP file name.

Dynamic Services for RADIUS Users

FIG. 5 is a block diagram illustrating an exemplary network system 150 for providing dynamic and secure network services for network service provider users such as Internet service provider users. In the exemplary embodiment, the network system is a unidirectional data-over-cable system having a telephone upstream connection via the PSTN 22. However, the exemplary embodiment is not limited to the telephony return systems, and exemplary methods for providing dynamic services to Internet service provider users could also be applied in the two-way data-over-cable systems. Further, other types of network systems or return paths could also be employed such as a wireless return path, for example. The exemplary data-over-cable system 150 includes, in addition to network devices illustrated in FIG. 1, an Internet Service Provider ("ISP") 156. According to an exemplary embodiment, the ISP 156 provides means such as computers and/or network servers via which a client device such as the CPE 18 may connect to the data network 28. To connect to the data network 28, a CPE user may dial one or more telephone numbers to establish a network connection to one of the computers that are owned or managed by the ISP 156. Alternatively, a user can employ other types of connections such as a cable network connection or a wireless connection to establish a communication session with the ISP 156.

As is known in the art, after the user of the CPE 18 establishes a communication link with the ISP 156, the next step of the process is to create an IP environment for the communication session. One of the most critical components of this step is to securely authenticate a user of the CPE 18. According to an exemplary embodiment, the CPE users are divided into two categories: a normal service user and a premium service user. In one embodiment, the normal service users are provided static network services from a RADIUS 152 and do not have access to dynamic services. Conversely, the premium service users, apart from the static network services, have the ability to request network services dynamically upon establishing a communication session with the ISP 156.

The RADIUS 152 is a distributed security system that uses an authentication server to solve security problems associated with a remote network device such as the CPE 18, for example. In addition to the authentication of the ISP 156 users, the RADIUS 156 may also upload customized profiles to access ports. For example, the RADIUS 156 stores a customized profile for each registered user, and, when the ISP 156 requests a profile, the RADIUS may determine the customized profiles based on the user identity. In one embodiment of the distributed client/server architecture associated with the RADIUS 152, the ISP 156 is a client and a RADIUS server holds and delivers authentication and profile information directly or acts as a proxy to other information servers. Therefore, when a CPE user is configured to use the RADIUS 156, the CPE user has to enter identification information via, for example, a customized login prompt. In such an embodiment, the user enters a username and a password via a graphical user interface. Alternatively, the user may use a link framing protocol such as the Point-to-Point Protocol ("PPP") which has authentication packets that carry this information. Once the ISP 156 obtains the user identification information, the ISP 156 may authenticate the user using the RADIUS 152. In one embodiment, the ISP 156 creates a data packet such as an "Access-Request" message including a plurality of attributes such as a username, a password, an identifier of the ISP 156, and a port identifier that the ISP 156 is accessing, for example. When a password is present in an "Access-Request" message, the password may be encrypted using, for example, a message digest algorithm such as a MD5 algorithm, for example.

The "Access-Request" messages are sent from the ISP 156 to the RADIUS server 152 over the network such as a Local Area Network ("LAN") or a Wide Area Network ("WAN"), so that network managers may locate RADIUS clients remotely from RADIUS servers. When the RADIUS authentication server receives an "Access-Request" message, the RADIUS authentication server validates the request and decrypts the username and password specified in the request. Next, the RADIUS authentication server may consult a database of users to retrieve a service profile associated with the username specified in the "Access-Request" message. A service profile includes a static record that is created for the user once the user registers with the ISP 156 employing RADIUS authentication process to authenticate its user. The user profile contains a list of configuration information attributes that are necessary to begin service delivery to the user. For example, the configuration information attributes may define a service type, a compression protocol or login IP host information, for example. In one embodiment, the compression protocol attribute may specify that a user requires, for example, the TCP/IP, Point-to-Point Protocol or Serial Line Internet Protocol ("SLIP") to connect to the data network 28. Further, some configuration attributes in the user profile may include filtering rules that define limitations on a user's access to specific resources on the network.

Once the RADIUS 152 authenticates the user and retrieves a user profile, the RADIUS 152 sends an "Access-Accept" message to the ISP 156. The "Access-Accept" message includes configuration information retrieved from the user profile that may be used on the ISP 156 to configure a network connection between the CPE 18 and the data network 28. However, if at any point of the authentication process the user identification conditions are not met, the RADIUS 152 may send an "Access-Reject" message to the ISP 156, and the ISP 156 denies a network access to the user.

Once the ISP 156 receives an "Access-Accept" message from the RADIUS 152, the ISP 156 implements the configuration attributes received in a policy profile on output and/or input circuits. In one embodiment, the user profile attributes may define a number of filter rules and access-rate settings. In such an embodiment, the ISP 156 may apply the filter rules to an output and input queues, so that the output and input queues respond consistently with the filter rules defined in the user profile. Thus, according to an exemplary embodiment, each normal service user may be associated with a predetermined user profile on the RADIUS 156, and the user profile includes a set of static network settings created for the normal service user.

According to an exemplary embodiment, the premium service users have the ability to request network services dynamically. In one embodiment, a Certificate Authority ("CA") 154 provides authorization records such as digital certificates to the premium users. FIG. 5 illustrates the CA 154 as a network entity in communication with the ISP 156; however, the ISP 156 could have an internal CA 154, for example. In one embodiment, a premium service user receives two digital certificates from the CA 154, a first authorization record that the premium service user may employ to dynamically request network services, and a second authorization record that may include a list of network services accessible to the user. Further, each authorization record is associated with two predetermined cryptographic data strings such as cryptographic key pairs that may be used on a premium service user CPE to create digital signatures that uniquely identify the user. One of the cryptographic keys, a private key is exclusively known to a signer and is used to create digital signatures and transform data into an unintelligible form. Conversely, a second key known as a public key is typically more widely known and is used by a relying party to verify a digital signature of the signer. Therefore, the two keys perform two different actions. If a signer wants to communicate in a secret manner with a relying party without the fear of a hacker impersonating the signer, the signer encrypts the communication.

There are a number of methods that may be used to create digital signatures. One method that may be used to create a digital signature involves two distinct processes. First a message created on a signer's network device may be indexed to a digest, or a "hash function". A hash function may be used for creating and verifying a digital signature. For example, a hash function may include an algorithm to create a digital representation in the form of a "hash value" or a "hash result" having a standard length and being substantially unique. Next, the signer's software may transform the "hash value" into a digital signature using the signer's private key. Thus, if such a method is used to create a digital signature, the resulting digital signature is unique to both the message and the private key that was used to generate it. Typically, a digital signature is attached to its message and stored or transmitted with the message. However, it may also be sent or stored as a separate data element, as long as it maintains a reliable association with its message.

To verify a digital signature, the verifier has to have an access to the signer's public key and have the assurance that it corresponds to the signer's private key. However, a public key and a private key have no inherent association with any person, and they are simply a pair of numbers. In order to associate a particular person or network entity with a key pair, more trusted entities are typically used to associate the signer with a specific public key.

According to the exemplary embodiment shown in FIG. 5, the CA 154 is arranged to issue authorization records, i.e. digital certificates, to premium users. An authorization record may include an electronic record that lists a public key as the subject of the authorization record, and confirms that the prospective signer such as a premium user identified in the authorization record holds the corresponding private key. The principal function of the certificate is to bind a key pair with a particular user so that a recipient of the certificate can use the public key listed in the certificate to verify that the digital signature was created with the corresponding private key. If such verification is successful, this chain of reasoning provides the assurance that the user listed in the certificate holds the corresponding private key, and that the digital signature was created by that particular user.

In one embodiment, to assure identity of the certificate, the CA 154 may digitally sign it. The CA's digital signature on the certificate can be verified using, for example, a public key of the CA 154 listed in another certificate created by another CA, and that certificate may be authenticated by a public key listed in yet another certificate, and so on, until the relying user is adequately assured of the authentication of the certificate. Further, a digital signature, whether created by a premium user to authenticate, for example, a dynamic network service request, or created on the CA 154 to authenticate its certificate, may be reliably stamped to allow a verifying party, such as the ISP 156, to determine reliably whether the digital signature was created during an operational period stated in the certificate.

To make a public key and its authentication record (a digital certificate) readily available for use during the verification processes, the certificates may be published in a repository or made available by other means. According to the exemplary embodiment shown in FIG. 5, when the CA 154 creates authorization records for the premium service users, the CA 154 sends the certificates to CPEs associated with the premium users as well as to the ISP 156. For example, the ISP 156 may include a repository for storing the authorization records associated with the premium service users. Thus, the retrieval of the authorization records can be accomplished automatically by having a retrieval program on the ISP 156 directly inquire the repository. Further, the status of each certificate in the repository may be updated. For example, an authorization record may become unreliable, and in such an embodiment, the CA 154 may temporarily invalidate or permanently revoke the certificate. When the CA 154 temporarily suspends or permanently revokes an authorization record, the CA 154 may publish notice of suspension or revocation. In one embodiment, the CA 154 may send the revocation notice to the ISP 156 and to the premium users associated with the revoked or suspended authentication records.

Further, the present invention is not limited to the use within the system illustrated in FIG. 5. More, fewer or different components, connections and interfaces could also be used. Further, the arrangements described herein are shown for purposes of illustration only, and those skilled in the art will appreciate that other arrangements and other elements, such as interfaces or functions, whether or not known in the art, can be used instead, and some elements may be omitted altogether. Additionally, as in most communications applications, those skilled in the art will appreciate that many of the elements described herein are functional entities that may be implemented as discrete components or in conjunction with other components, in any suitable combination and location.

FIG. 6 is a flow chart illustrating an exemplary method 160 for configuring user network entities based on a network service type selected on a network service provider. At step 162, a user network entity establishes a communication session with a predetermined network service provider. In one embodiment, the user network entity may establish the communication link with the network service provider via a dial-up connection of the PSTN network 22. Alternatively, the user network entity may establish the communication session with the network service provider via a different connection type such as a wireless connection, or a cable network connection, for example.

At step 164, the user of the user network entity selects a network service type from at least two network service types available on the network service provider. In one embodiment, the at least two service types available on the network service provider may include a normal service type and a premium service type. For example, the normal service type may be associated with a static network service type, and the premium service type may be associated with a dynamic network service type. Thus, when the user selects the premium service type, the user has an access to a predetermined set of static network services associated with the user and, further, has the ability to request network services dynamically. In one embodiment, the premium service user may, for example, dynamically request a predetermined set of QoS settings or may set priority rules for data transmission.

At step 166, the network service provider determines whether the user has selected the premium service type. If the user has not selected the premium service type, at step 168, the user enters user identification and information data to sign for the normal service type. For example, the user identification data may include a username and a password, and the user information data may include billing information data. However, the user information data may be network service provider specific, and different embodiments are possible as well.

Referring back to step 166, if the user selects the premium service type, at step 170, the user network entity receives two authorization records from the network service provider entity. In one embodiment, a first authorization record may include authorization data for requesting dynamic network services. The first authorization record is associated with predetermined data strings, one of which may be used for creating authentication identifiers on the user network entity. The second authorization record may include authorization data for requesting static network services from the user network entity associated with the premium user type. For example, the second authorization record may include a policy file or a radius profile with a plurality of static network service settings. In one embodiment, if the user applications require special settings such as more bandwidth than that offered by the static network settings, the user network entity may request dynamic network services using the first authorization record.

In the embodiment associated with the FIG. 5, the user network entity in the method 160 is the CPE 18, and the network service provider entity is the ISP 156. However, the exemplary embodiment is not limited to these network devices, and more, different or equivalent network devices could also be used. Further, the first authorization record may include a digital certificate with a plurality of extension fields that allow the user to request network services dynamically upon establishing a communication session with the network service provider entity. Additionally, the data strings associated with each certificate may include cryptographic key pairs, so that the user network entity may employ a private key associated with the first authorization record to sign messages including dynamic network service requests. Similarly, the user network entity may employ a private key associated with the second authorization record to sign messages including static network service requests. However, the method 160 is not limited to digital certificates, and different authentication means could also be used.

However, the exemplary embodiments are not limited to receiving the authorization records upon establishing a communication link with the ISP 156. For example, a user can receive the authorization records offline or may employ methods specified in RFC-2459 "Internet X.509 Public Key Infrastructure Certificate and CRL Profile." Further, according to an embodiment illustrated in FIG. 6, if the user does not select a premium network service type, the user may be given a number of options associated with different static services, and the user may select more than one static service type. If the user selects more than one static service type, the ISP 156 provides more than one authorization records associated with the selected static services. In such an embodiment, the user may select an appropriate authorization record depending on the need.

FIGS. 7A and 7B illustrate a method 180 for classifying user network entities to a predetermined network user types on a network service provider entity. At step 182, the user network entity establishes a communication link with the network service provider entity. In one embodiment, the network service provider may include a predetermined network connection via which first time users may establish communication sessions with the network service provider entity. In such an embodiment, the user network entity may connect to a predetermined sign-up application on the network service provider.

At step 184, the network service provider entity queries the user to select a network service type from at least two network service types available on the network service provider. In one embodiment, the at least two service types available on the network service provider may include a normal service type and a premium service type. For example, the normal service type may be associated with a static network service type, and the premium service type may be associated with a dynamic network service type. Thus, when the user selects the premium service type, the user has an access to a predetermined set of static network services associated with the user and, further, has the ability to request dynamic network services.

At step 186, the network service provider entity determines whether the user selected the premium service type. If the user has not selected the premium service type, at step 188, the network service provider entity classifies the user as a normal service type user and invokes a predetermined normal user application. At step 190, the network service provider entity queries the user for user information data such as a user's last name, address, or billing information, for example. Further, the network service provider entity may query the user to input identification data such as a username and password. Alternatively, the network service provider entity may provide a default username and a default password for the user.

At step 192, the network service provider entity establishes a communication session with an authentication network server to create a user profile on the authentication network server. In one embodiment, the user profile may include the user identification data and a plurality of network services statically assigned to the user network entity. Thus, when the normal service type user network entity requests network services from the network service provider entity, the network service provider entity may query the authentication network server to authenticate the user. If the user is a valid user, the authentication network server may provide a user profile to the network service provider entity. In such an embodiment, when the network service provider entity receives the user profile from the network service provider entity, the network service provider may establish a communication link between the user network entity and a data network based on the static network service parameters specified in the received user profile.

Referring back to step 186, if the user selects the premium network service type, at step 194 in FIG. 7B, the network service provider entity classifies the user as a premium service user and invokes a premium service user application. At step 196, authorization records are created for the user network entity. In one embodiment, the authorization records may include a first authorization record that enables the user network entity to request network services dynamically, and a second authorization record that enables the user network entity to request static network services. For example, the network service provider entity may include a first network device for creating the first and second authorization records. Alternatively, the first network device may be a network device in communication with the network service provider entity.

In one embodiment, the first and second authorization records may include digital certificates. In such an embodiment, prior to the generation of digital certificates on the first network device, the user network entity may generate two key pairs, each key pair having, for example, a private key and a public key. For example, the user network entity may include a browser such as a Netscape Navigator 3.0 or higher that may have a built-in ability to generate the key pairs. Once the user network entity creates the key pairs, the user network entity may then send certificate generation requests to the first network device. For example, each certificate generation request includes the user's identity and a public key that the user network entity intends to use with the certificate. When the first network device receives the certificate generation requests, the first network device generates and signs the certificates, supplying additional values for certificate fields based on a predetermined set of rules. According to an exemplary embodiment, the first certificate may include a set of extension that define the user network device's policy information terms including, for example, object identifiers or other parameters that classify the user network entity as a premium user type network entity. Further, the first certificate may include a set of values that the user network entity may request dynamically, or a set of prohibited values that the user network entity is forbidden to request dynamically. For example, the set of values may define a maximum bandwidth that the user network entity may request dynamically. The second certificate may include a number of static network service attributes that are associated with the user network entity. In such an embodiment, the user network entity may determine whether the network service settings specified in the second certificate are adequate for a type of communication link that the user network entity may wish to establish. If the network service settings associated with the second certificate are not the optimal settings, the user network entity may use the first certificate to dynamically request a set of network services.

At step 198, the network service provider entity stores the authorization records in a repository such as a database. For example, the database may keep a list of all authorization records associated with the premium network service users, and a list of revoked authorization records. Thus, the network service provider entity wishing to validate an authorization record may check the database to ensure that the authorization record has not been placed on the revocation list.

At step 200, the network service provider entity provides the authorization records to the user network entity. Upon a receipt of the authorization records, the user network entity may start requesting dynamic network services.

In the embodiment associated with FIG. 5, the user network entity in the method 180 is the CPE 18, the network service provider entity is the ISP 156, and the first network device is the CA 154. However, the exemplary method 180 is not limited to these network devices, and fewer, different or equivalent network devices could also be used. Further, the first and second authorization records may include digital certificates such as Internet X.509 certificates. However, other types of security certificates could also be used, and the exemplary methods are not limited to Internet X.509 security certificates. For more information on Internet X.509 security certificates, see RFC-2459, "Internet X.509 Public Key Infrastructure Certificate and CRL Profile," by R. Housley, W. Ford, W. Polk and D. Solo, incorporated herein by reference. For more information on X.509 security certificate management, see RFC-2510 "Internet X.509 Public Key Infrastructure Certificate Management Protocols," by C. Adams and M. Farell, and RFC-2511 "Internet X.509 Certificate Request Message Format," by M. Myer, C. Adams, D. Solo, and D. Kemp, incorporated herein by reference.

According to an exemplary embodiment, when a user network entity such as the CPE 18 receives authorization records from the ISP 156, the user network entity may request dynamic network services from the ISP 156. FIG. 8 is a flow chart illustrating an exemplary method 210 for requesting dynamic network services on a user network entity from a network service provider entity. At step 212, a user network entity retrieves from a database an authorization record for requesting dynamic network services. For example, the database may include two authorization records, a first authorization record for requesting network services dynamically and a second authorization record associated with a predetermined statically provisioned network service policy. At step 214, the user network entity creates a first message to request network services dynamically. The first message may be created when a user of the user network entity wishes to set up, for example, priority rules so that VoIP data are given priority over other types of data. The first message may include a plurality of fields such as a message type field, a certificate field, a message body field and an identifier field. In an embodiment associated with the method 210, the first message is associated with a dynamic network service request and, thus, the first message has a dynamic message type.

At step 216, the user network entity includes the first authorization record in the first message. In one embodiment, the user network entity includes the first authorization record in the certificate field of the first message. For example, the first authorization record may include a digital certificate with a plurality of extension fields that define the user as a premium network service type user so that the user network entity may request network services dynamically. At step 218, a set of dynamic network services is specified in the body of the first message. In one embodiment, the user of the user network entity may select a policy to give priority to voice traffic so that, for example, when a queue on a network service provider is full, the VoIP data is given priority over other types of data. Alternatively, the first message may define a predetermined QoS profile. Table 2 illustrates an exemplary QoS profile that may be specified in the first message.

TABLE 2

```
START
SETUP:
{
        Fire Wall      = OFF;
}
/*Policy for marking video traffic*/
POLICY: "IPP7"
{
#DiffServ:
        LOW_DELAY=NO;
        HIGH_THROUGHPUT=YES;
        HIGH_RELIABILITY=NO;
        PRECEDENCE=006;
}
/*Filter to take action on video traffic*/
ASSOCIATION: OUTGOING "A11"
{
    Policy   ="IPP7";
    Client_IP = 149.112.101.143;
    Peer_Port = 3456;/*Video port*/
}
END
```

At step 220, the user network entity places an identifier in the identifier field of the first message. In one embodiment, the identifier includes a digital signature that is generated on the user network entity. The user network entity generates the digital signature using one of the cryptographic keys such as a private cryptographic key associated with the authorization record for requesting dynamic network services. To create the digital signature, the user network entity may first delimit borders of the first message. Next, the user network entity may compute a hash result on the first message using one of the existing or later developed hash functions and, once the hash result is computed, the user network entity may encrypt the hash result using the private encryption key. Thus, the resulting digital signature is unique to the first message and to the private encryption key that was used to create it.

At step 222, the user network entity establishes a communication session with a network service provider entity. In the embodiment illustrated in FIG. 5, the user network entity may establish the communication session with the user network entity via a dial-up network such as the PSTN network 22. However, the exemplary embodiment is not limited to the dial-up architecture, and the user network entity could establish the communication link to the network service provider via other types of connections. In the embodiment illustrated in FIG. 5, the user network entity could have a bi-directional cable connection to the network service provider. However, the method 210 is not limited to these types of connections, and other types of connections such as a broadband wireless connection, a fixed wireless connection, an ADSL connection, a DSL connection, or a fiber optics connection could also be used to establish the communication session with the network service provider entity.

At step 224, the user network entity sends the first message to the network service provider entity. At step 226, a communication link between the user network entity and a data network is established. In one embodiment, the established communication link is configured based on the network service configuration parameters dynamically specified in the first message. For example, if the first message specified a QoS configuration parameter set such as the one in Table 1, the communication link is configured based on the specified QoS set.

According to the embodiment illustrated in FIG. 5, the user network entity is the CPE 18, the network service provider entity is the ISP 156, and the data network is the data network 28. However, the exemplary embodiment is not limited to these network devices, and more, fewer, different or equivalent network devices could also be used.

Figure 9:
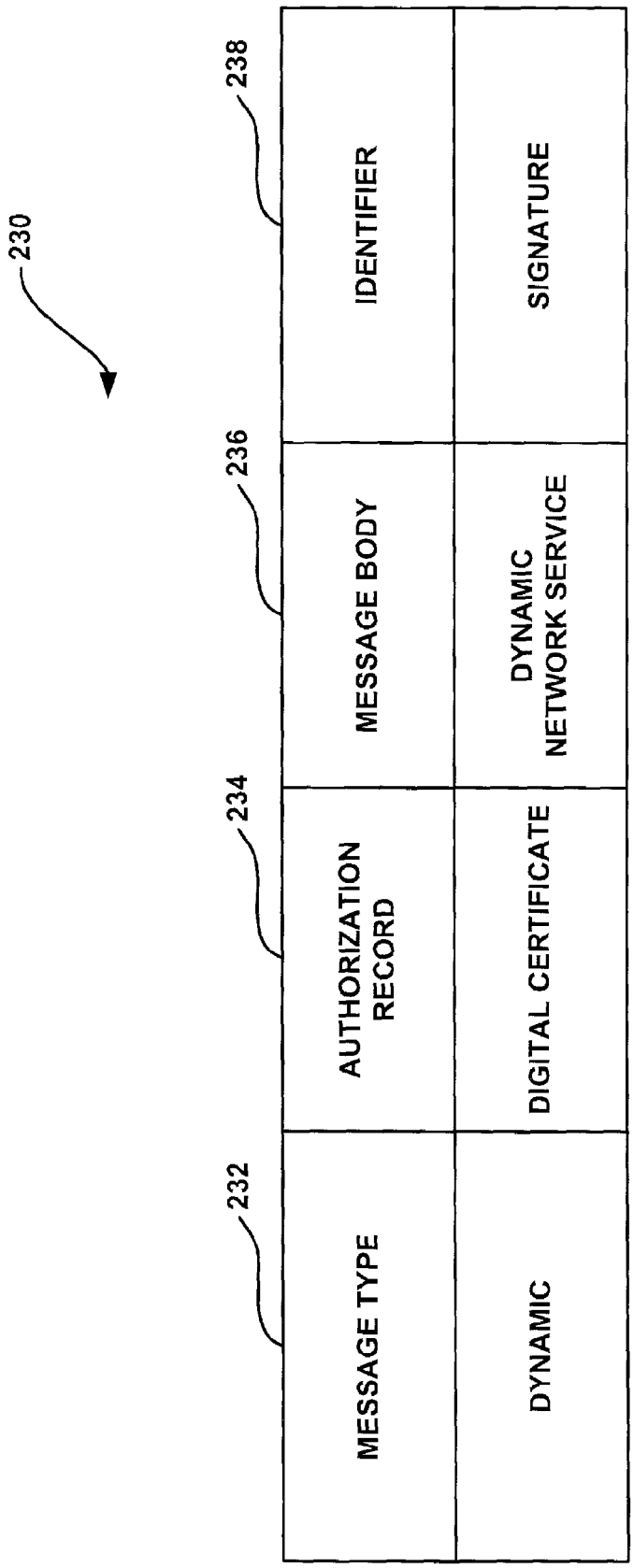
FIG. 9 is a block diagram illustrating a message structure for requesting dynamic network services.

FIG. 9 is a block diagram illustrating a message structure 230 that may be created on network entities associated with the premium network users to dynamically request network services. For example, the first message described in reference to FIG. 8 may have the message structure 230. The message 230 includes four fields: a message type field 232, a message authorization field 234, a message body 236, and a message identifier 238. In one embodiment described in greater detail with reference to FIG. 8, the message type field includes an identifier associated with a dynamic message type, the message authorization field 234 includes a digital certificate that may be used by the user network entity to request dynamic network services, the message identifier 238 includes a digital signature created on the user network entity using a private encryption key, for example.

Further, the message body 236 includes network service policy settings or rules specified by the user network entity. For example, the network service policy settings could be associated with one or more predetermined identifiers that may map to one or more settings so that a user may select a predetermined identifier to define a predetermined set of network service policy settings. In such an embodiment, when the user selects one or more predetermined identifiers to request dynamic network services, an application on the user network entity may map the selected identifiers to their settings prior to sending the message to a network service provider entity. Alternatively, the network service identifiers may be global identifiers. In such an embodiment, the message body 236 may include one or more identifiers that are mapped to predetermined network service settings when the message is received on a network service provider entity. However, it should be understood that the message structure 230 is only an exemplary message structure, and other types of messages having more or fewer message fields could also be used for requesting dynamic network services from network service provider entities.

Figure 10:
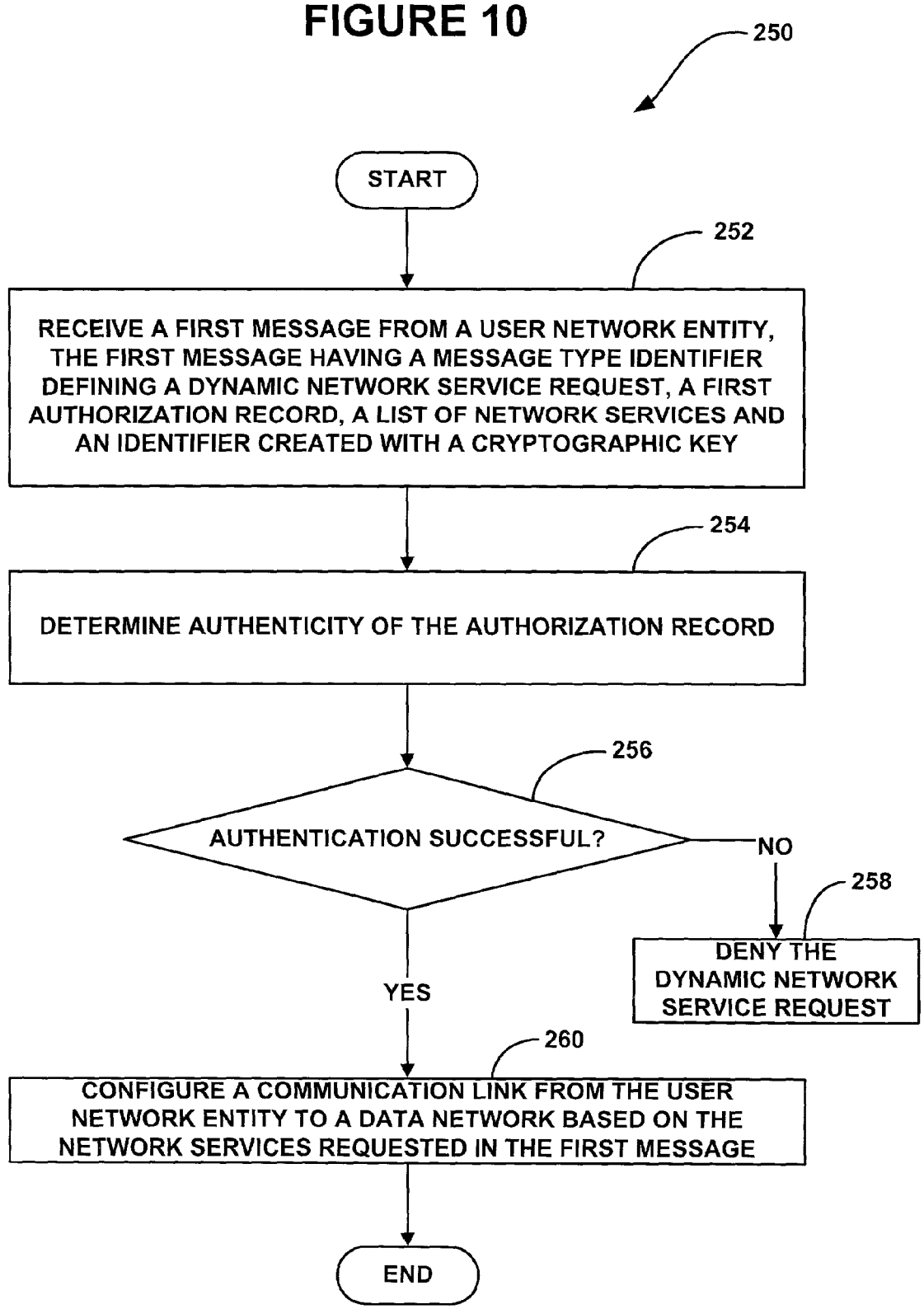
FIG. 10 is a flow chart illustrating an exemplary method for providing dynamic network services to user network entities.

FIG. 10 is a flow chart illustrating an exemplary method 250 for receiving dynamic network service requests on a network service provider entity from a user network entity, and providing the dynamic network services to the user network entity.

At step 252, a network service provider entity receives a first message from a user network entity. According to an exemplary embodiment, the first message includes a first message type defining a dynamic network service request, a first authorization record for requesting dynamic network services, a list of network services for configuring a network connection between the user network entity and a data network, and an identifier created on the user network entity. For example, a format of the first message may include the message format described in reference to FIG. 9. In such an embodiment, the first authorization record includes a digital certificate, and the identifier includes a digital signature generated on the user network entity with a private cryptographic key, for example.

At step 254, the network service provider entity determines authenticity of the authorization record. Specifically, the authorization record may include a public encryption key for the authorization record for which the user network device has the corresponding private encryption key. In one embodiment, the authenticity of the authentication record may be verified using the public encryption key. To verify the authenticity of the authorization record, the network service provider validates the identifier such as the digital signature included in the authorization record (digital certificate) of the user. Further, the network service provider entity may determine whether the authorization record for the user network entity has not been revoked. Alternatively, the network service provider entity may query the first network device to provide an authorization record binding the user network entity to the public key specified in the first message.

At step 256, the network service provider entity determines whether the authentication process was successful. For example, if the network service provider determines that the authorization record for the user network device has been revoked, at step 258, the network service provider denies the dynamic network service request in the first message. However, if the network service provider entity determines that the authorization record is authentic, and the user network entity is associated with the public encryption key in the authorization record, at step 260, the network service provider entity configures a communication link between the user network entity and a data network based on the network services requested in the first message.

According to an exemplary embodiment illustrated in FIG. 5, the user network entity in the method 250 is the CPE 18, the network service provider is the ISP 156, and the first network device is the CA 154. However, the exemplary embodiment is not limited to these network devices, and fewer, more, different or equivalent network devices could also be used. Further, in one embodiment, the authenticity of the authorization record may be determined using a Lighweigth Directory Access Protocol ("LDAP") as described in detail in RFC-2559 "Internet X.509 Public Key Infrastructure Operational Protocols-LDAPv2", for example.

As mentioned in reference to FIG. 6, when the CPE 18 requests a premium network service type, the CPE 18 receives two authorization records, one for dynamically requesting network services and one for requesting static network services. Thus, the authorization record for static network services may include a list of attributes associated with a static network service policy available to the CPE 18. If a user does not wish to change the settings associated with the static network service policy, and the static network service policy configuration are efficient for any applications that the user plans to run during a communication session with a second CPE, then, the user may request the static network service policy upon establishing a communication session with the ISP 156. Further, the static services may include bandwidth cards similar to calling cards. In such an embodiment, a user associated with one or more bandwidth cards may request a bandwidth from the ISP 156 in combination with a static authorization record associated with the bandwidth card. In such an embodiment, an accounting manager network entity on the ISP 156 may keep track of the bandwidth usage of users associated with the bandwidth cards. In such an embodiment, the bandwidth associated with a predetermined bandwidth card is exceeded or once a bandwidth reaches a predetermined bandwidth limit, the ISP 156 may notify the user that the user should either employ a different bandwidth card or that the user should request a new bandwidth card. However, those skilled in the art will appreciate that different embodiments are possible as well.

Figure 11:
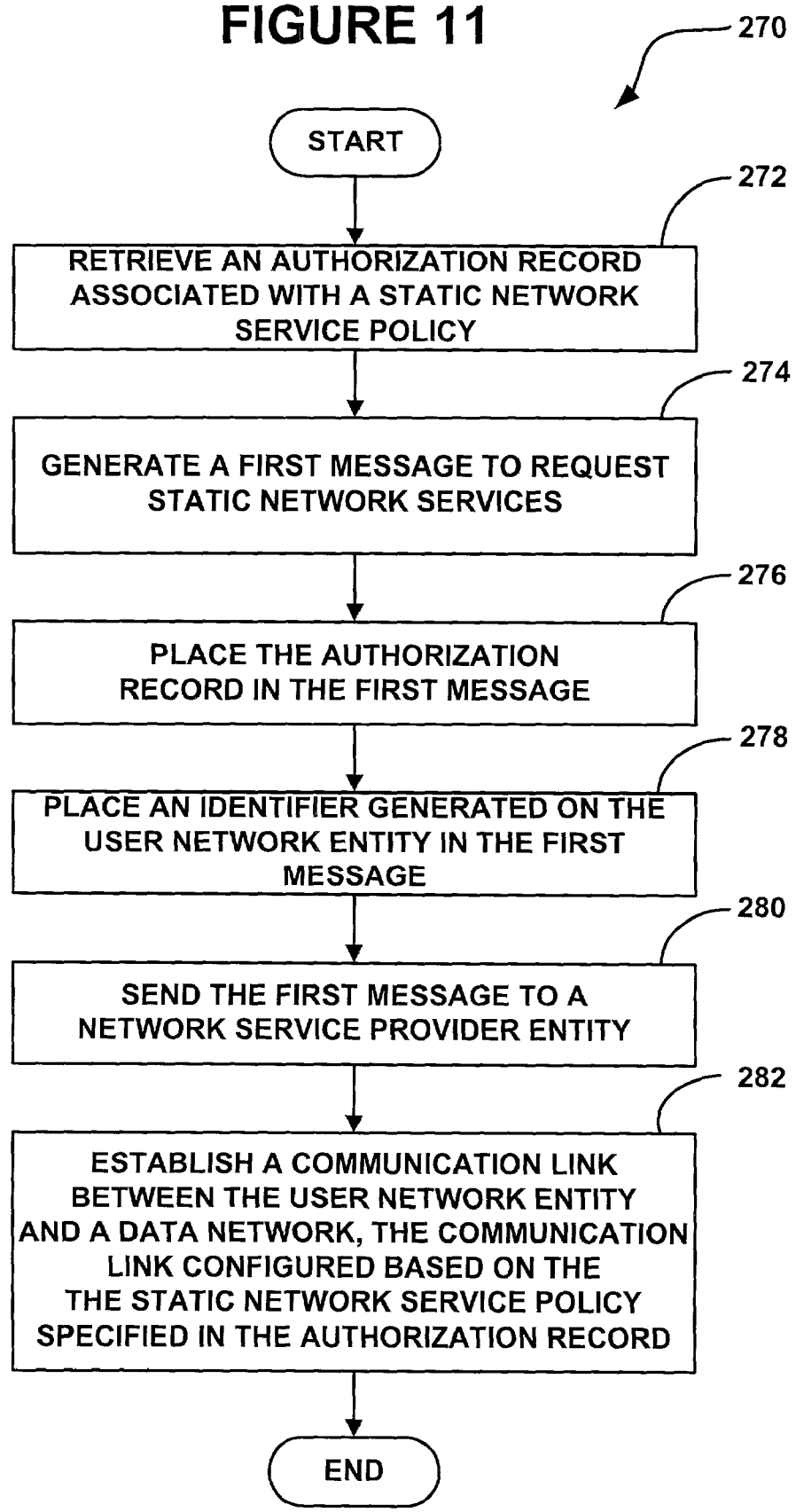
FIG. 11 is a flow chart illustrating an exemplary method requesting static network services according to one embodiment.

FIG. 11 is a flow chart illustrating a method 270 for requesting static network services on a user network entity from a network service provider entity according to an exemplary embodiment. At step 272, a user network entity retrieves from a database an authorization record for requesting static network services. For example, the database may store a first authorization record for requesting dynamic network services and a second authorization record for requesting static network services. In one embodiment, the second authorization record may include a digital certificate with a number of extension defining configuration parameters associated with the static network service policy such as QoS parameters, filter rules, or network priority rules, for example. Alternatively, the static network service policy may be associated with a predetermined policy identifier that is globally known, and may be mapped to a predetermined set of network service settings on a network service provider entity.

At step 274, the user network entity generates a first message to request a static network service policy from a network service provider entity. In one embodiment, the first message includes a plurality of fields such as a message type field, an authorization record field, and an identifier field. According to one embodiment, when the user network entity generates the first message, the message type field includes a static message type identifier.

At step 276, the user network entity places the second authorization record in the authorization record field of the first message. At step 278, an identifier is placed in the identifier field of the first message. In one embodiment, the identifier includes a digital signature that is generated on the user network entity using, for example, a private cryptographic key associated with the second authorization record. To create the digital signature, the user network entity may first delimit borders of the first message. Next, the user network entity may compute a hash value on the first message using one of the existing or later developed hash functions. Once the hash value is computed, the user network entity may employ the private cryptographic key associated with the second authorization record to encrypt the hash value, thus, generating the digital signature. Therefore, the created digital signature is not only unique to the private key that was used but also to the first message. However, the exemplary method is not limited to creating the digital signature in such a manner, and different methods could also be used.

At step 280, the user network entity sends the first message to a network service provider entity via a communication link established between the user network entity and the network service provider entity. In one embodiment, the communication link is established prior to the generation of the first message, or, alternatively, the communication link may be established upon the generation of the first message. Further, the communication link may be established via a dial-up network such as a PSTN network. Alternatively, other types of connections such as a wireless connection, an optical fiber connection, a cable connection, a DSL connection or an ADSL connection could also be used to establish a communication session with the network service provider entity.

At step 282, a communication link is established between the user network entity and a data network. When the network service provider entity establishes the communication link, the network service provider entity configures the communication link using the configuration parameters associated with the static network service policy specified in the first message received from the user network entity.

According to an exemplary embodiment in FIG. 5, the user network entity is the CPE 18, the network service provider entity is the ISP 156, and the data network is the data network 28. However, the exemplary method 270 is not limited to these network devices, and fewer, more, different or equivalent network devices could also be used.

Figure 12:
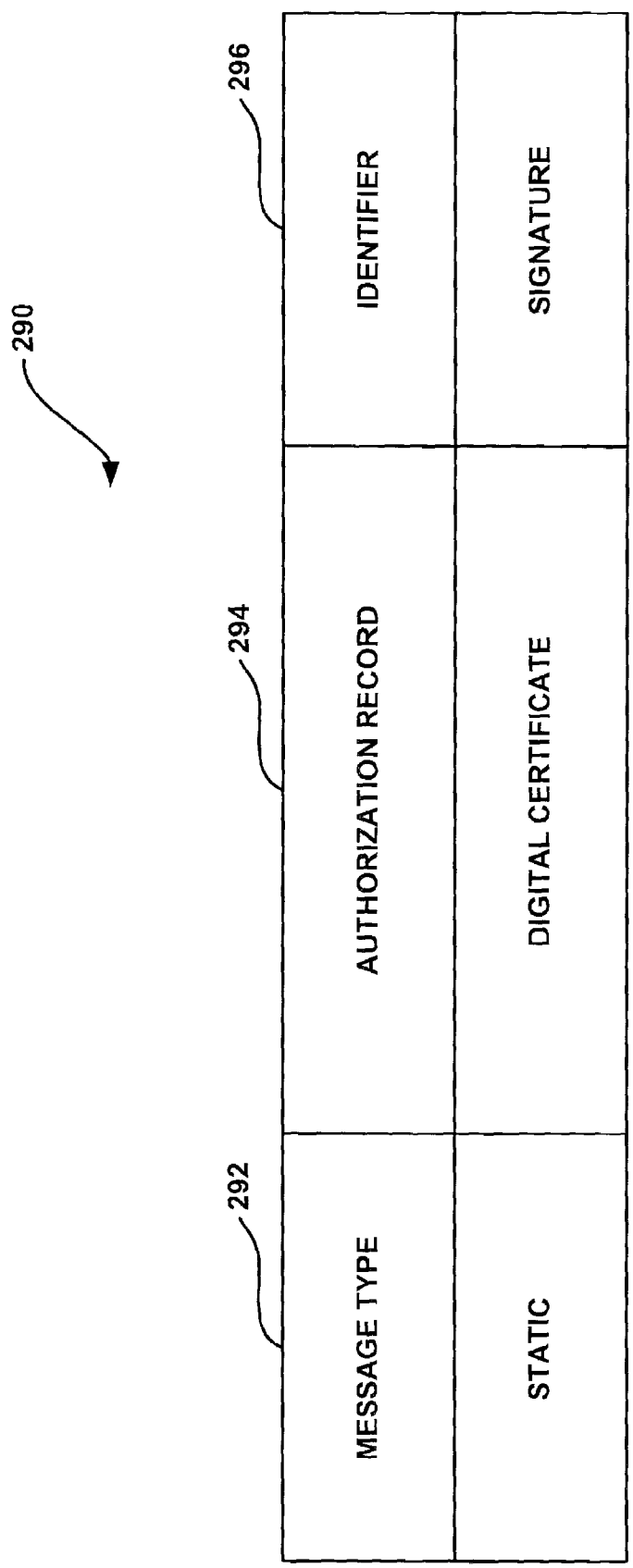
FIG. 12 is a block diagram illustrating an exemplary message structure for requesting static network services.

FIG. 12 is a block diagram illustrating a message structure 290 that may be created on network entities associated with a premium network service type to statically request network services. The message 290 includes three fields: a message type field 292, an authorization field 294 and an identifier field 296. In one embodiment that was described in reference to FIG. 11, the message type field 292 includes an identifier associated with a static message type, the authorization record field 294 includes a digital certificate that is used by the user network entity to request static network services, and the message identifier includes a digital signature created on the user network entity using a private encryption key, for example. However, it should be understood that the exemplary embodiments are not limited to the message structure 290, and messages with fewer or more message fields could also be used to request static network services from network service provider entities.

FIG. 13 is a flow chart illustrating a method 300 for receiving static network service requests on a network service provider entity from a user network entity associated with a premium network service type.

At step 302, a network service provider entity receives a first message from a user network entity. According to an exemplary embodiment, the first message includes a message type defining a static network service request, an authorization record for requesting network services statically, and an identifier created on the user network entity. For example, a format of the first message may include the message format described in reference to FIG. 12. In such an embodiment, the authorization record may define a set of static configuration settings or, alternatively, the authorization record may include a policy identifier that maps to a predetermined network service policy. For example, the policy identifier may be a numerical identifier or a name of a predetermined network service policy. Further, the identifier created on the user network entity may include a digital signature generated with a predetermined private key associated with the authorization record.

At step 304, the network service provider entity determines authenticity of the authorization record. Specifically, the authorization record may include a public encryption key for the authorization record for which the user network device has the corresponding private encryption key. In one embodiment, the authenticity of the authorization record may be verified using the public encryption key. For example, the network service provider entity may determine whether a first network device arranged to generate and keep track of the authorization record assignments has not revoked the authorization record for the user network entity. In one embodiment, the network service provider entity may include the first network device or, alternatively, the network service provider entity may communicate with the first network device via a communication link.

At step 306, the network service provider entity determines whether authentication of the authorization record was successful. If the network service provider has determined that the authorization record was not authentic or that the user network entity was not associated with the public encryption key of the record, or that the authorization record has been revoked, at step 308, the network service provider entity denies the assignment of static network services specified in the first message. Thus, the network service provider entity does not create a network connection between the user network entity and a data network. However, if the network service provider entity determines that the authorization record is authentic, at step 310, the network service provider entity establishes a communication session between the user network entity and the data network. Further, the network service provider entity configures communication links between the user network entity and the data network based on the static network service policy specified in the first message. In one embodiment, the first message may include a list of attributes associated with the policy. Alternatively, the first message may include an identifier associated with the static policy so that when the network service provider entity receives the first message, the identifier is mapped to a predetermined set of attributes associated with that identifier.

According to an exemplary embodiment illustrated in FIG. 5, the user network entity is the CPE 18, the network service provider entity is the ISP 156, the first network device is the CA 154, and the data network is the data network 28. However, the exemplary method is not limited to these network devices, and fewer, more, different or equivalent network devices could also be used.

According to an exemplary embodiment, the ISP 156 could be implemented with a firewall system. In one embodiment, the firewall system on the ISP 156 could be implemented for packet filtering, monitoring or logging of sessions between the data network and other network. In one embodiment, the packet filtering firewall may simply filter packets transmitted between two networks to which it is connected. To do this, the firewall system uses protocols that are employed on the two networks, such as TCP/IP, for example, so that the firewall system knows the structure of the protocols and, thus, can filter data within them. In one embodiment, the firewall system could be controlled with a number of filtering rules that may differ for an ingress interface and for egress interface. Thus, typically, a network administrator can specify different access rules and a list of connections from and to the data network such as an Internet network.

As is known in the art, each service on the Internet such as Telnet, Web or e-mail is associated with a predetermined TCP or UDP port number. Thus, most firewall systems are designed to detect a specific port number and process data packets associated with that port number according to a set of filtering rules. In one embodiment, to filter a service, a predetermined port number with predetermined filter specifications could be defined on a firewall system. For example, a File Transfer Protocol ("FTP"), a client/server service that allows users to log on from remote computers and transfer files, is based on the TCP port 21, the Telnet is based on the TCP port 23, and the World Wide Web is based on the TCP port 80. Therefore, to filter access to the Web and FTP for a user, the ISP 156 could filter ports 21 and 80 without filtering TCP port 21.

According to an exemplary embodiment, a premium user can dynamically specify a plurality of filtering rules upon establishing a communication session with the ISP 156. FIG. 14 is a flow chart illustrating an exemplary method 320 for dynamically setting filtering rules on a network service provider entity. At step 322, the network service provider entity receives a first message from a user network entity. In the embodiment associated with the method 320, the first message includes a first message type defining a dynamic network service request, a first authorization record that the user network entity employs to dynamically request network services, a list of the filtering rules, and an identifier generated on the user network entity. For example, a format of the first message may include the message format 230 described in reference to FIG. 9. In such an embodiment, the first authorization record includes a digital certificate for requesting dynamic network services, and the identifier includes a digital signature created on the user network entity with a private cryptographic key. However, the exemplary method is not limited to the message format 230, and different message formats could also be used.

At step 324, the network service provider entity determines authenticity of the authorization record. Specifically, the authorization record may include a public cryptographic key for which the user network entity has the associated private cryptographic key that is used to create digital signatures. In one embodiment, the authenticity of the authorization record may be determined using the public key associated with the authorization record. To verify the authenticity of the authorization record, the network service provider entity may validate the identifier (digital signature) included in the authorization record received from the user network entity. Further, the network service provider entity may determine whether the authentication record for the user network entity has not been revoked. Alternatively, the network service provider may request the first network device to provide an authorization record binding the user network entity to the public key specified in the first message.

At step 326, the network service provider entity determines whether the authentication of the authorization record has been successful. If the authentication process was not successful, or the authorization record for the user network entity has been revoked, at step 328, the network service provider entity denies the dynamic network service request specified in the first message. Specifically, the network service provider entity denies setting up the filtering rules for the network traffic associated with the user network entity. However, if the authentication of the authorization record has been successful, at step 330, the network service provider entity implements the filtering rules requested in the first message. According to an exemplary embodiment, the network service provider applies the filtering rules to a network connection between the user network entity and a data network. Further, the network service provider entity applies the filtering rules in such a manner so that unwanted packets are filtered on the network service provider entity. Filtering of the unwanted packets on the network service provider entity has many advantages. For example, if the user network entity is associated with slow dial-up connections, the bandwidth could be saved since the unwanted data packets would be filtered on the network service provider entity. However, the exemplary embodiment associated with the method 320 is not limited to applying the filtering rules on the network service provider entity, and different embodiments are also possible.

According to the exemplary embodiment illustrated in FIG. 5, the user network entity in the method 320 is the CPE 18, the network service provider entity is the ISP 156, the first network device is the CA 154, and the data network is the data network 28. However, the exemplary embodiment is not limited to these network entities, and fewer, more, different or equivalent network devices could also be used.

Thus, according to the exemplary embodiments described in the flow charts, the methods are based on the distributed system architecture, and the authentication of the users is not based on the centralized architecture such as the one of a typical RADIUS authentication that employs user profiles stored in a centralized location. Therefore, according to an exemplary embodiment, a user may obtain network services associated with the user from a different ISP than a primary ISP associated with the user. In such an embodiment, the primary ISP may be associated with a number of ISPs that have the ability to provide dynamic or static services according to the described embodiments. Thus, when a secondary ISP receives, for example, a dynamic service request from a premium service user, the secondary ISP may verify the authenticity of the request using a digital signature associated with a digital certificated included in the request. For example, when one or more authorization records are created and signed by the issuing authority (ISP 156 or the CA 154), the authorization records may be sent to the secondary ISPs. Further, when a secondary ISP receives a request with a certificate signed by the issuing authority, the secondary ISP validates the authenticity of the received authorization record by validating an identifier such as a digital signature included in the authorization record of the user. Such an embodiment would be very useful for roaming or mobile users as they may pay for network services at their primary network service providers and may access the network services from any other secondary ISP.

Further, it should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for providing dynamic network services for ISP users may be embodied in a computer program product that includes a computer usable medium. For example, such as, a computer usable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for dynamically receiving dynamic network services on network devices in a computer network, the method comprising:

receiving an authorization record from a first network device on a second network device, the authorization record comprising a first certificate associated with a first data string and a second data string, the first certificate authorizing the second network device to dynamically request network services from a third network entity, wherein the authorization record further comprises a second certificate comprising network service configuration settings available to the second network device, wherein the network service configuration settings comprise one or more bandwidth card identifiers for requesting bandwidth from the third network entity;

sending a first message from the second network device to the third network entity, the first message comprising a request for dynamic network services, a request for a bandwidth associated with one of the bandwidth card identifiers and further comprising the first certificate and a first identifier created with the first data string; and establishing a communication link between the second network device and a data network based on the network services requested in the first message.

2. A computer readable medium having stored therein instructions for causing a processor to execute the method of claim 1.

3. The method of claim 1, further comprising establishing a communication session with the third network entity prior to the step of sending the first message to the third network entity.

4. The method of claim 1, wherein the first data string comprises a private cryptographic key, and the second data string comprises a public cryptographic key.

5. The method of claim 1, wherein the first network device comprises a certificate authority, the second network device comprises a customer premises equipment entity, and the third network entity comprises a network service provider network entity.

6. The method of claim 1, wherein the first certificate comprises an X.509 security digital certificate.

7. The method of claim 1, wherein the second certificate further comprises a third data string and a fourth data string.

8. The method of claim 7, wherein the second certificate comprises an X.509 security certificate.

9. The method as claimed in claim 7, wherein the third data string comprises a private cryptographic key, and the fourth data string comprises a public cryptographic key.

10. The method as claimed in claim 7, further comprising:

establishing a communication session with the third network entity;

sending a second message to the third network entity, the second message comprising the second certificate and a second identifier created with the third data string; and establishing a communication link between the second network device and the data network based on the network service configuration settings defined in the second certificate.

11. The method as claimed in claim 10, wherein the second identifier comprises a digital signature.

12. A method for providing dynamic network services for network devices in a computer network, the method comprising:

sending an authorization record from a first network device to a second network device, the authorization record comprising a first certificate with a first data string and a second data string, the first certificate authorizing the second network device to dynamically request network services from a third network entity, wherein the authorization record further comprises at least one second certificate comprising network service configuration settings available to the second network device, the second certificate further comprising a third data string and a fourth data string, wherein the network service configuration settings comprise one or more bandwidth card identifiers;

receiving a first message from the second network device on the third network entity, the first message comprising a request for dynamic network services, the first certificate signed with an identifier generated with the first data string;

determining whether to provide dynamic network services to the second network device; and, if so, establishing a communication link between the second network device and a data network based on the network services specified in the first message.

13. A computer readable medium having stored therein instructions for causing a processor to execute the method of claim 12.

14. The method of claim 12, wherein the first network device comprises a certificate authority, the second network device comprises a customer premises equipment entity, and the third network entity comprises a network service provider network entity.

15. The method of claim 12, wherein the first data string comprises a private cryptographic key, and the second data string comprises a public cryptographic key.

16. The method of claim 12, wherein the identifier created with the first data string comprises a digital signature.

17. The method of claim 12, wherein the first certificate comprises an Internet X.509 digital certificate.

18. The method of claim 12, wherein the second certificate comprises an Internet X.509 digital certificate.

19. The method as claimed in claim 12, wherein the third data string comprises a private cryptographic key, and the fourth data string comprises a public cryptographic key.

20. The method as claimed in claim 12, further comprising:

receiving a second message on the third network entity, the second message comprising the second certificate and a second identifier created with the third data string;

establishing a communication link between the second network device and the data network based on the network service configuration settings specified in the second certificate.

21. The method as claimed in claim 20, wherein the second identifier created with the third data string comprises a digital signature.

22. A method for requesting dynamic network services in a computer network comprising a plurality of network devices, the method comprising:

receiving a digital certificate on a user network entity from a first network service provider entity, the digital certificate for accessing dynamic network services, the digital certificate comprising a digital signature generated on a certificate authority entity;

generating a first message on the user network entity, the first message comprising a request for dynamic network services signed with a digital signature generated using a private encryption key associated with the digital certificate, the first message further comprising the digital certificate received on the user network entity; and sending the first message to the first network service provider entity to request a communication link between the user network entity and a data network based on the dynamic network services.

23. A computer readable medium having stored therein instructions for causing a central processing unit to execute the method of claim 22.

24. The method of claim 22, further comprising:

receiving the first message on the network service provider entity; and providing the dynamic network services requested in the first message to the user network entity.

25. The method of claim 22, further comprising, sending the first message to a network service provider entity other than the first network service provider entity.

26. The method of claim 24, further comprising verifying authenticity of the digital certificate in the first message using the digital signature prior to the step of providing dynamic network services requested in the first message.

27. A method for providing dynamic network services to a user network entity in a computer network comprising a plurality of network devices, the method comprising:

generating a digital certificate for requesting dynamic network services from a network service provider entity;

providing the digital certificate to the user network entity;

receiving a first message on the network service provider entity, the first message comprising a request for dynamic network services, a list of network traffic filtering rules and the digital certificate for requesting the dynamic network service, the first message signed with a digital signature generated with a private encryption key associated with the digital certificate;

verifying an authenticity of the digital certificate in the first message; and providing the requested network services to the user network entity including applying the filtering rules to a network connection between the user network entity and the computer network.

28. A computer readable medium having stored therein instructions for causing a processor to execute the method of claim 27.

29. A method for receiving network services on network devices in a computer network, the method comprising:

receiving a dynamic certificate for requesting dynamic network services and at least one static certificate for requesting static network services on a user network entity, wherein the at least one static certificate comprises at least one user bandwidth card identifier;

generating a first message on the user network entity, the first message comprising a static certificate from the at least one static certificate received on the user network entity, the first message further comprising a request for a bandwidth associated with one of the user bandwidth card identifiers and further comprising a digital signature generated with a private encryption key associated with the static certificate; and sending the first message to a first network service provider entity.

30. A computer readable medium having stored therein instructions for causing a processor to execute the method of claim 29.

31. The method of claim 29, wherein the step of receiving the dynamic certificate and the at least one static certificate comprises receiving the certificates from the first network service provider entity.

32. The method of claim 29, wherein the step of receiving the dynamic certificate and the at least one static certificate comprises receiving the certificates from a second network service provider entity.

33. The method of claim 29, further comprising, receiving the first message on the first network service provider entity;

determining an authenticity of the static certificate in the first message;

determining whether the requested bandwidth does not exceed the bandwidth associated with the user bandwidth card identifier in the first message; and, if so, providing the requested bandwidth to the user.

34. The method of claim 29, further comprising:

generating a second message on the user network entity, the second message comprising a request for dynamic network services, the dynamic certificate and a digital signature created with a private encryption key associated with the dynamic certificate; and sending the second message to the first network service provider entity.

35. The method of claim 34, further comprising:

receiving the second message on the first network service provider entity;

determining whether the dynamic certificate is authentic; and, if so, providing the network services specified in the second message to the user network entity.

36. A method for providing distributed, dynamic and secure network services to remote access users in a computer network, the method comprising:

receiving a first Internet X.509 digital certificate on a user network entity from a first network service provider entity, the first Internet X.509 digital certificate authorizing a user of the user network entity to request dynamic network services, the first Internet X.509 digital certificate comprising a digital signature of the first network service provider entity;

generating a first message on the user network entity to request dynamic network services, the first message comprising the first Internet X.509 digital certificate and a digital signature generated on the user network entity using a private cryptographic key associated with the first X.509 digital certificate;

sending the first message to a second network service provider entity;

determining whether to provide dynamic network services to the user network entity using the digital signature of the first network service provider in the first X.509 digital certificate received in the first message; and, if so, establishing a communication link between the user network entity and a data network based on the network service requested in the first message.

37. A computer readable medium having stored therein instructions for causing a processor to execute the method of claim 36.

38. A system for providing distributed, dynamic and secure network services to remote access users in a computer network, the system comprising:

a first network device for providing digital certificates to a user network entity, the digital certificates for requesting dynamic network services and static network services;

a first digital certificate for binding a first public encryption key for the user network entity, the first digital certificate for requesting dynamic network services and including a set of values defining a bandwidth that the user network entity may request dynamically; and a second digital certificate for binding a second public encryption key for the user network entity, the second digital certificate for requesting static network services, wherein the user network entity determines whether the static network services specified in the second digital certificate are adequate for a type of communication link that the user network entity desires to establish, and if not the user network entity uses the first digital certificate to dynamically request a set of network services.

39. The system as claimed in claim 38, wherein the first network device comprises a network service provider entity comprising a certificate authority for providing the digital certificates.

40. The system as claimed in claim 38, wherein the first digital certificate and the second digital certificate are employed on the user network entity to request network service from at least one network service provider entity.

* * * * *